(12) United States Patent
Owen

(10) Patent No.: US 8,436,291 B2
(45) Date of Patent: May 7, 2013

(54) AUTOMATED PILL DISPENSING SYSTEMS FOR DETECTING CHARACTERISTICS OF BOTTLES IN OUTPUT CHUTES USING MODULATED LIGHT SOURCES AND RELATED METHODS OF OPERATION

(75) Inventor: Gary M. Owen, Raleigh, NC (US)

(73) Assignee: Parata Systems, LLC, Durham, NC (US)

(*) Notice: Subject to any disclaimer, the term of this patent is extended or adjusted under 35 U.S.C. 154(b) by 271 days.

(21) Appl. No.: 12/846,503

(22) Filed: Jul. 29, 2010

(65) Prior Publication Data

US 2012/0029692 A1 Feb. 2, 2012

(51) Int. Cl.
*H01J 40/14* (2006.01)

(52) U.S. Cl.
USPC .................................................. 250/222.1

(58) Field of Classification Search ............... 250/222.1, 250/221, 214 B
See application file for complete search history.

(56) References Cited

U.S. PATENT DOCUMENTS

| 4,891,624 A * | 1/1990 | Ishikawa et al. ............. 340/436 |
| 5,763,873 A * | 6/1998 | Beck et al. ................. 250/214 B |
| 2005/0057753 A1* | 3/2005 | Mosley et al. ............... 356/436 |

* cited by examiner

*Primary Examiner* — Thanh Luu
(74) *Attorney, Agent, or Firm* — Myers Bigel Sibley & Sajovec, P.A.

(57) ABSTRACT

A method of operating a detection system includes receiving a detection signal representing aggregate light emission received from a plurality of optical emitter elements at an optical detector, and determining, from the detection signal, respective light emission received from one of the optical emitter elements based on a respective signature thereof in the detection signal. The respective signature is independent of an emission wavelength of the respective light emission. Related detection systems and automated pill dispensing systems are also discussed.

24 Claims, 18 Drawing Sheets

(No Vial)

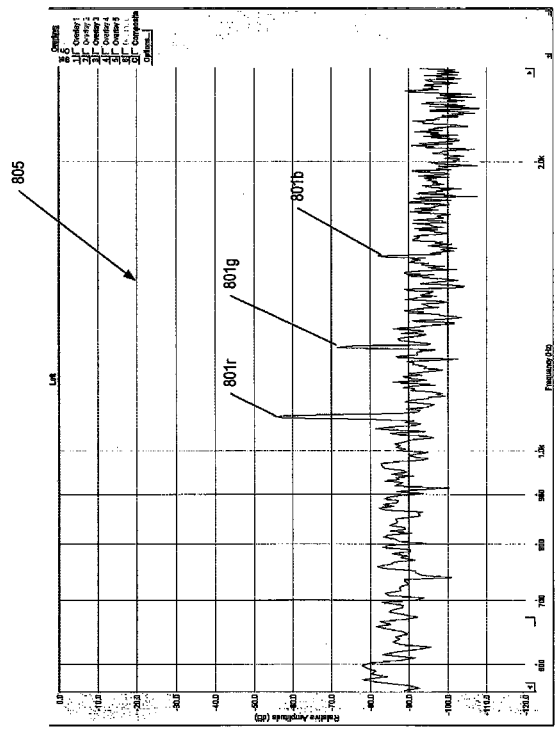
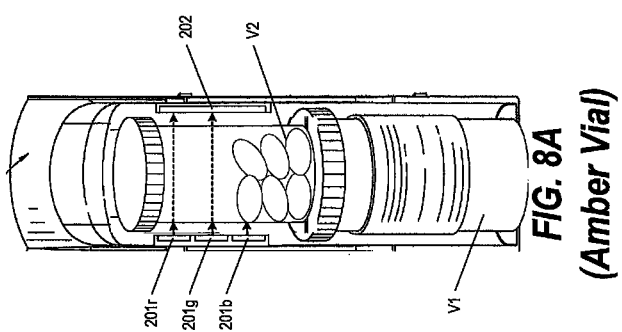
FIG. 8B
FIG. 8A
(Amber Vial)

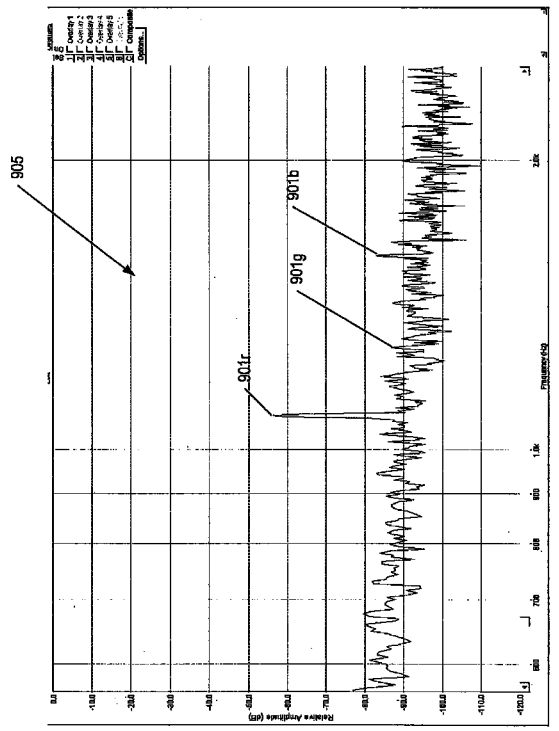

(Green Vial)

AUTOMATED PILL DISPENSING SYSTEMS FOR DETECTING CHARACTERISTICS OF BOTTLES IN OUTPUT CHUTES USING MODULATED LIGHT SOURCES AND RELATED METHODS OF OPERATION

FIELD OF THE INVENTION

The present invention relates to automated systems for dispensing containers, such as pill-containing bottles or vials, and related methods of operation.

BACKGROUND OF THE INVENTION

Pharmacy generally began with the compounding of medicines which entailed the actual mixing and preparing of medications. Heretofore, pharmacy has been, to a great extent, a profession of dispensing, that is, the pouring, counting, and labeling of a prescription, and subsequently transferring the dispensed medication to the patient. Because of the repetitiveness of many of the pharmacist's tasks, automation of these tasks has been desirable.

Some attempts have been made to automate the pharmacy environment. Different exemplary approaches are shown in U.S. Pat. No. 5,337,919 to Spaulding et al. and U.S. Pat. Nos. 6,006,946; 6,036,812 and 6,176,392 to Williams et al. The Williams system conveys a bin with tablets to a counter and a vial to the counter. The counter dispenses tablets to the vial. Once the tablets have been dispensed, the system returns the bin to its original location and conveys the vial to an output device. Tablets may be counted and dispensed with any number of counting devices. Drawbacks to these systems typically include the relatively low speed at which prescriptions are filled and the absence in these systems of securing a closure (i.e., a lid) on the container after it is filled.

One additional automated system for dispensing pharmaceuticals is described in some detail in U.S. Pat. No. 6,971,541 to Williams et al. This system has the capacity to select an appropriate vial, label the vial, fill the vial with a desired quantity of a selected pharmaceutical tablet, apply a cap to the filled vial, and convey the labeled, filled, capped vial to an offloading station for retrieval. Although this particular system can provide automated pharmaceutical dispensing, certain of the operations may be improved. For example, in some automated pill dispensing systems such as those described in U.S. patent application Ser. No. 12/350,568 to Schedel et al., the filled pill vials may be output to an offload chute for retrieval by a pharmacist or other human operator, and an optical sensor may be used to detect the presence or absence of vials in the offload chute. However, when using an optical sensor for detection, it may be difficult to detect transparent vials, especially when the vials are empty and/or unlabeled. Also, external factors, such as ambient lighting, conditions, may affect the accuracy of the optical sensors in optically detecting the presence or absence of vials in a chute and/or other locations in the system.

SUMMARY OF THE INVENTION

According to some embodiments of the present invention, a method of operating a detection system includes receiving a detection signal representing aggregate light emission received from a plurality of optical emitter elements at an optical detector and determining, from the detection signal, respective light emission received from one of the optical emitter elements based on a respective signature thereof in the detection signal. The respective signature is independent of an emission wavelength of the respective light emission.

In some embodiments, the respective signature may indicate a characteristic of a control signal applied to the one of the optical emitter elements. For example, the characteristic may be a frequency of the control signal. The respective light emission received from the one of the optical emitter elements may be determined by determining a signal strength of the detection signal at the frequency of the control signal applied to the one of the optical emitter elements.

In some embodiments, the method may further include applying respective control signals to the plurality of optical emitter elements, where each of the optical emitter elements may provide light emission indicative of a characteristic of a respective one of the control signals applied thereto. From the detection signal, a relative level of the light emission received from each of the optical emitter elements may be determined based on the characteristic of the respective one of the control signals applied thereto indicated by the detection signal. For example, where the characteristic is a frequency of the control signal, a frequency domain representation of the detection signal may be filtered at respective frequencies of the respective control signals applied to each of the optical emitter elements, and a relative power level of the frequency domain representation of the detection signal may be determined at each of the respective frequencies.

In some embodiments, a relative level of light emission received from each of the optical emitter elements may be determined from the detection signal based on respective signatures thereof in the detection signal, where the respective signatures may be independent of emission wavelength. A physical characteristic of an object proximate to the optical detector may be detected based on an optical characteristic thereof indicated by the relative level of the light emission received from each of the optical emitter elements.

In some embodiments, the light emission from each of the optical emitter elements may correspond to a different color of a visible spectrum, and the physical characteristic may be a color of the object.

In some embodiments, a position of the object relative to the optical detector may be determined based on respective positions of the optical emitter elements and the relative level of the light emission received from each of the optical emitter elements.

In some embodiments, the object may be a pill bottle or vial in a pill dispensing system. As such, the physical characteristic may include a presence or absence of the vial, a color of the vial, a labeling status of the vial, and/or a fill level of the vial. The fill level of the vial may indicate that the vial is full, partially-filled, or empty.

In some embodiments, the respective signature may be a respective tone indicating a switching frequency of the light emission that is distinct from that of an ambient light source.

According to further embodiments of the present invention, a detection system includes an optical sensor and a controller circuit coupled thereto. The optical sensor includes a plurality of emitter elements and a detector configured to be operated cooperatively to output a detection signal representing aggregate light emission received from the plurality of emitter elements. The controller circuit is operable to determine, from the detection signal, respective light emission received from one of the emitter elements based on a respective signature thereof in the detection signal, where the respective signature is independent of an emission wavelength thereof.

According to still further embodiments of the present invention, an automated pill dispensing system includes a receptacle configured to hold pill bottles or vials, an optical sensor located at a predetermined location in the receptacle, and a controller circuit coupled to the optical sensor. The optical sensor includes a plurality of emitter elements and a detector configured to be operated cooperatively to output a detection signal representing aggregate light emission received from the plurality of emitter elements. The controller circuit is operable to determine, from the detection signal, a relative level of light emission received from each of the emitter elements based on respective signatures thereof in the detection signal, where the respective signatures are independent of emission wavelength.

In some embodiments, the controller circuit may be further operable to determine at least one physical characteristic of a vial in the receptacle based on at least one optical characteristic thereof indicated by the relative level of the light emission received from each of the emitter elements. The controller circuit may also be operable to control a next depositing event whereby a next vial is deposited in the receptacle responsive to determination of the at least one physical characteristic of the vial in the receptacle.

Although described above primarily with respect to system and method aspects of the present invention, it will be understood that the present invention may also be embodied as computer program products. Also, the present invention may include any and all combinations of the above embodiments.

BRIEF DESCRIPTION OF THE FIGURES

FIGS. 8A-8B illustrate chute conditions and detection signals when an amber vial is present adjacent to the sensor in a chute unit.

FIGS. 9A-9B illustrate chute conditions and detection signals when a red vial is present adjacent to the sensor in a chute unit.

DETAILED DESCRIPTION OF EMBODIMENTS OF THE INVENTION

Figure 1A:
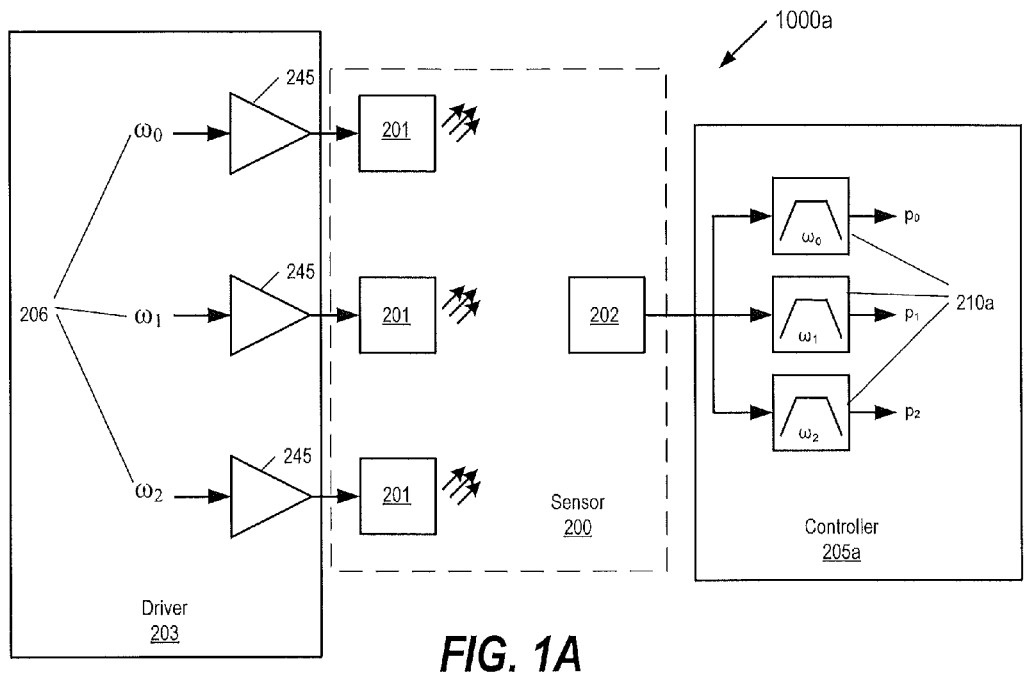
FIGS. 1A-1B are block diagrams illustrating optical detection systems according to some embodiments of the present invention.

The present invention will now be described more fully hereinafter, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art. In the drawings, like numbers refer to like elements throughout.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein the expression "and/or" includes any and all combinations of one or more of the associated listed items.

It will be understood that when an element is referred to as being "connected to" or "coupled to" another element, it can be directly connected or coupled to the other element or intervening elements may be present. In contrast, when an element is referred to as being "directly connected to" or "directly coupled to" another element, there are no intervening elements present.

It will also be understood that, although the terms first, second, etc. may be used herein to describe various elements, these elements should not be limited by these terms. These terms are only used to distinguish one element from another.

In addition, spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

Some embodiments may be embodied in hardware (including analog circuitry and/or digital circuitry) and/or in software (including firmware, resident software, micro-code, etc.). Consequently, as used herein, the term "signal" may take the form of a continuous waveform and/or discrete value(s), such as digital value(s) in a memory or register. Furthermore, various embodiments may take the form of a computer program product on a computer-usable or computer-readable storage medium having computer-usable or computer-readable program code embodied in the medium for use by or in connection with an instruction execution system. Accordingly, as used herein, the terms "circuit" and "controller" may take the form of digital circuitry, such as a logic gate array and/or computer-readable program code executed by an instruction processing device(s) (e.g., general purpose microprocessor and/or digital signal processor), and/or analog circuitry. Although some of the diagrams include arrows on communication paths to show a primary direction of communication, it is to be understood that communication may occur in the opposite direction to the depicted arrows. Well-known functions or constructions may not be described in detail for brevity and/or clarity.

Some embodiments of the present invention may arise from realization that the ability to detect the presence and/or other physical characteristics of a pill-containing bottle or vial in an offload or output chute may be important in an automated pill dispensing system. Accordingly, embodiments of the present invention provide systems and methods for detecting physical characteristics of an object (such as a pill bottle or vial in an output chute) placed in the path between a multi-wavelength modulated optical emitter (such as a plurality of light emitting diodes (LEDs)) and an optical detector (such as a phototransistor or photodiode) by measuring the optical spectral characteristics of the object.

Figure 1B:
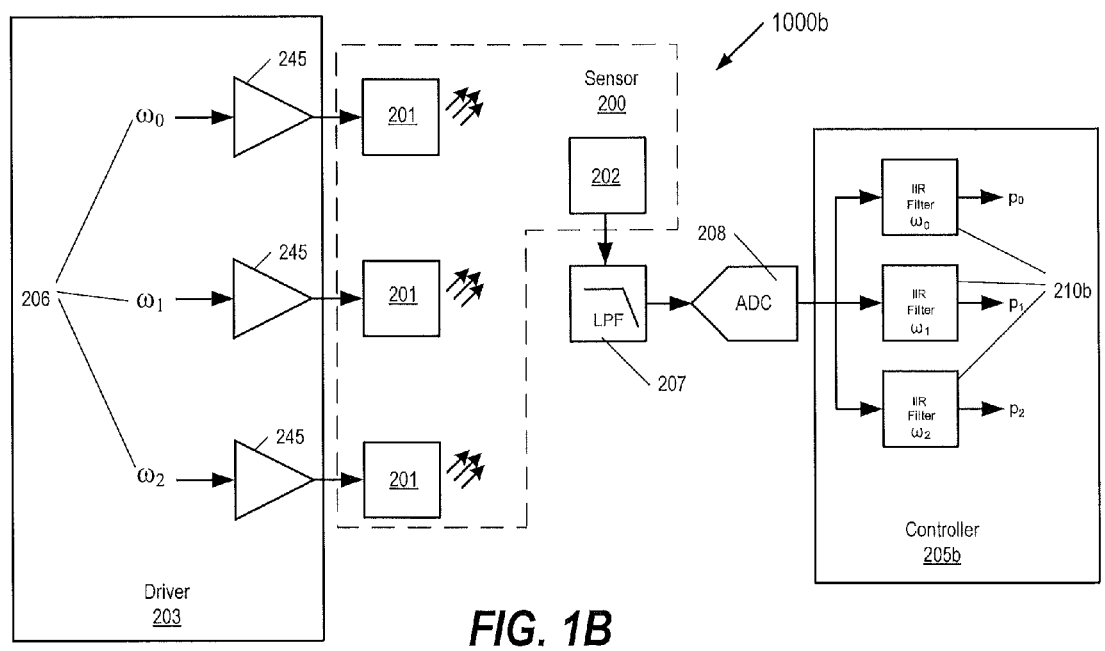

FIGS. 1A and 1B illustrate optical detection systems according to some embodiments of the present invention. In particular, FIGS. 1A and 1B illustrate continuous and discrete-time detection systems $1000a$ and $1000b$, respectively. Referring now to FIGS. 1A and 1B, detection systems according to embodiments of the present invention include an optical sensor 200, a driver circuit 203 operable to provide control signals to the optical sensor 200, and controller circuits $205a/205b$ operable to receive a detection signal output from the optical sensor 200. The optical sensor 200 includes a photo emitter (including a plurality of photo emitter elements 201) and a photo detector 202. The photo emitter elements 201 may be LEDs that are operable to emit optical signals (also referred to herein as "light output" or "light emission") over one or more wavelength ranges of the ultraviolet, infrared, and/or visible spectrum, for example, to provide light emission corresponding to one or more colors. For instance, emitter elements 201 that provide light emission of different wavelengths may be used to determine the color of an object. On the other hand, two or more of the emitter elements 201 may emit light over the same or overlapping wavelength ranges in some embodiments, for example, to determine the position or fill-level of an object. The photo detector 202 is operable to receive the optical signals output from the photo emitters 201 and to output a detection signal representative of the optical signals received from the plurality of photo emitter elements 201. As such, the detection signal may represent aggregate light emission received from the plurality of photo emitter elements 201 at the photo detector 202 in some embodiments.

The driver circuit 203 is operable to apply respective control signals to the emitter elements 201 to modulate the respective optical signals output therefrom. As shown in FIGS. 1A and 1B, the driver circuit 203 includes a plurality of amplifiers 245 operable to amplify respective modulation signals 206 to provide different modulating control signals to each of the emitter elements 201. As such, each of the emitter elements 201 is operable to output light having a unique signature, which is distinct from a wavelength of its light emission, in response to the respective control signals provided by the driver circuit 203. In particular embodiments, the modulation signals 206 are each provided at a different frequency (illustrated as frequencies $\omega_0$, $\omega_1$, and $\omega_2$), such that the driver circuit 203 provides switching signals having different frequencies to each of the emitter elements 201. The frequencies $\omega_0$, $\omega_1$, and $\omega_2$ are also different from and/or unrelated to the wavelengths of light output by the emitters 201. Each of the emitter elements 201 is thereby driven by a discrete switching function to modulate its light output (e.g., its carrier signal) to provide a unique "tone," which indicates the frequency at which the emitter element was switched. As such, the unique signature of the light output from each of the emitter elements 201 may also indicate a characteristic of the respective control signal applied thereto, such as the frequency at which the control signal was modulated. The frequencies $\omega_0$, $\omega_1$, and $\omega_2$ of the modulation signals 260 may be selected such that respective tones of the light output from the emitter elements 201 are distinct from that of ambient light, for example, as provided by light sources running on 60 Hz wall power. As such, the light output received from the photo emitters 201 may be more easily distinguished from that of ambient light sources in the detection signal output from the photo detector 202. The driver circuit 201 may be operable to apply the respective control signals to the photo emitter elements 201 substantially simultaneously in some embodiments, while the photo detector 202 may be controlled separately from the photo emitter elements 201.

Still referring to FIGS. 1A and 1B, the controller circuits $205a$ and $205b$ perform frequency domain analysis of the detection signal output from the photo detector 202 to determine the relative amount of light received from each of the photo emitter elements 201 based on indicia of the respective signatures included the detection signal. More particularly, the controller circuit $205a$ of FIG. 1A uses analog filters $210a$ having respective center frequencies $\omega_0$, $\omega_1$, and $\omega_2$ corresponding to the frequencies $\omega_0$, $\omega_1$, and $\omega_2$ at which the photo emitter elements 201 were switched to determine the respective amounts of light received from each photo emitter element 201 based on the filtered output signals $p_0$, $p_1$, and $p_2$, while the controller circuit $205b$ of FIG. 1B receives the detection signal as output from a low pass filter 207 and an analog-to-digital converter (ADC) 208 and uses digital infinite impulse response (IIR) filters $210b$ (for example, as implemented by a digital signal processor (DSP)) to filter the detection signal at the frequencies $\omega_0$, $\omega_1$, and $\omega_2$ of the control signals to provide the filtered output signals $p_0$, $p_1$, and $p_2$ indicating the amount of light received from each of the emitter elements 201. In some embodiments, the controller circuits $205a$ and/or $205b$ may receive an indication of the switching frequencies $\omega_0$, $\omega_1$, and $\omega_2$ of the control signals applied to the emitter elements 201 from the driver circuit 203 to provide the appropriate filtering, while in other embodiments, the controller circuits 205a and/or 205b may provide the modulation signals 206 to the driver circuit 203 and/or may otherwise control the driver circuit 203 to modulate the light output of the photo emitter elements 201 at the respective frequencies $\omega_0$, $\omega_1$, and $\omega_2$. As such, the controller circuits 205a and/or 205b may be operable to determine a relative power level of the light received from each of the emitter elements 201 based on one or more characteristics of the respective control signals applied to the emitter elements 201 by the driver circuit 203. The optical spectral characteristics indicated by the relative signal strengths of the received light at the respective frequencies $\omega_0$, $\omega_1$, and $\omega_2$ of the modulated control signals may be further used by the controller circuits 205a and/or 205b to determine physical characteristics of an object proximate to the optical sensor 200, as described in detail below with reference to FIGS. 7A-10B.

The digital IIR filters 210b of FIG. 1B employ the Goertzel algorithm, which is a digital signal processing (DSP) technique for identifying predetermined frequency components of a signal. In particular, the Goertzel algorithm computes a sequence s(n) and an output sequence y(n) given an input sequence x(n), according to the following equations:

$$s(n) = x(n) + 2\cos\left(\frac{2\pi k}{N}\right)s(n-1) - s(n-2) \quad (1)$$

$$y(n) = s(n) - e^{-j\frac{2\pi}{N}k}s(n-1), \quad (2)$$

where x(n) indicates the input signal (e.g., the detection signal) received from the photo detector 202, y(n) indicates the output signal of the IIR filters 210b, and $\omega_K$ indicates the frequency of the modulated control signal, where k=0, 1, 2 in the above example. As such, the IIR filters 210b respectively isolate the detection signal at the specific frequencies $\omega_0$, $\omega_1$, and $\omega_2$ of the modulated control signals, such that the controller 205b may determine the relative levels of the light output received from each of the photo emitter elements 201 based on the respective signal strengths of the detection signal at the respective frequencies $\omega_0$, $\omega_1$, and $\omega_2$ of the modulated control signals and the knowledge of the particular control signal applied to each of the emitter elements 201.

Referring again to FIGS. 1A and 1B, detection systems 1000a and 1000b according to some embodiments of the present invention may be used to determine one or more physical characteristics of an object proximate to the optical sensor 200 based on optical characteristics thereof indicated by the relative amounts of light received from the emitter elements 201. Embodiments of the present invention may also be used to determine the position of such an object relative to the optical sensor 200 by inference. For example, using the known position of two or more photo emitter elements 201 and the unique signatures of the light output from each, the position of an object may be inferred by evaluating a detection signal representing the light received from the plurality of photo emitter elements 201 received at the photo detector 202 to determine the relative amount of light received from each photo emitter element 201.

The optical sensor 200 of FIGS. 1A and 1B may be a reflective-type sensor (e.g., where the surface of an object is illuminated by the emitter elements 201 and the reflected light is measured by the detector 202) or a beam-break-type sensor (e.g., where the object at least partially blocks the path of light between the emitter elements 201 and the detector 202). In some embodiments, the photo detector 202 may be a single broad spectrum detector that is operated asynchronously from the photo emitters 201, and the detection signal may represent a combination of the light output from the plurality of photo emitter elements 201. However, in other embodiments, the photo detector 202 may include a plurality of detector elements, and the detection signal may represent a combination of a plurality of detection signals output from respective ones of the plurality of detector elements responsive to synchronous operation of the photo emitter elements 201 and corresponding detector elements. Also, although illustrated as providing control signals directly to the photo emitters 201 to modulate the light output thereof, it will be understood that driver circuits 203 according to some embodiments of the present invention may indirectly modulate the light output of the photo emitters 201, for example, by providing the control signals to control the switching of respective liquid crystal shutters to modulate the light output from each of the photo emitters 201.

Figure 2:
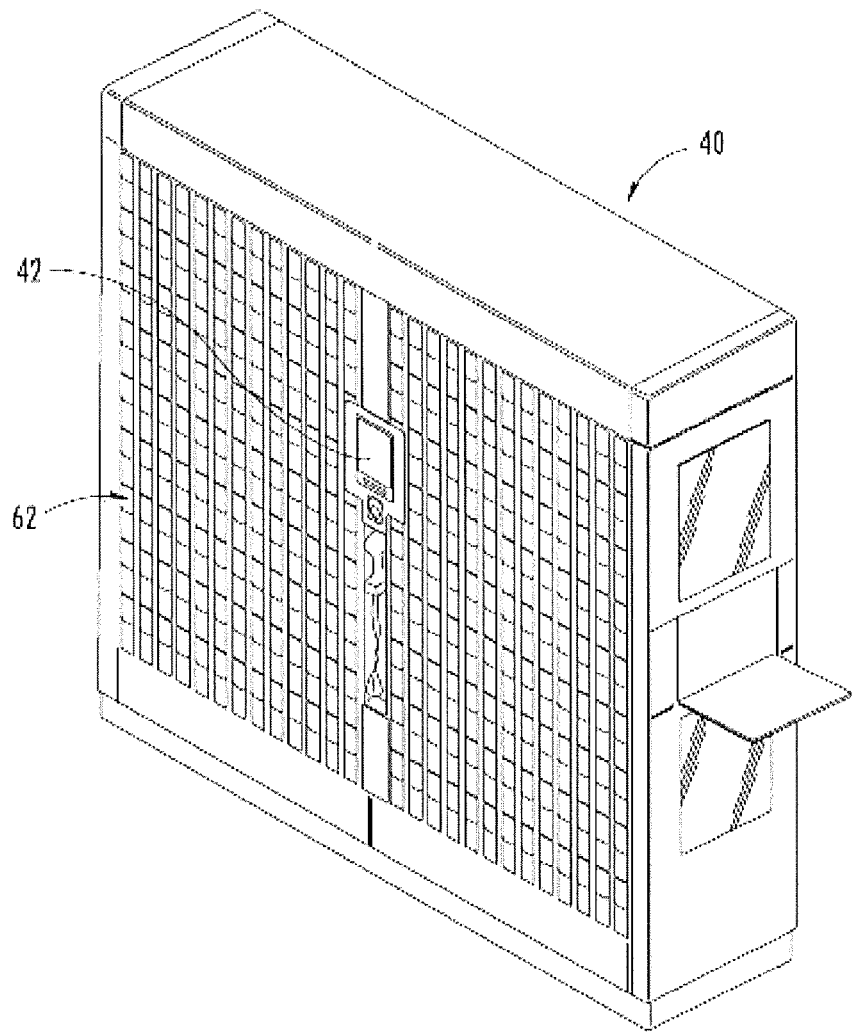
FIG. 2 is a top, front perspective view of a pharmaceutical dispensing system according to some embodiments of the present invention.
Figure 3:
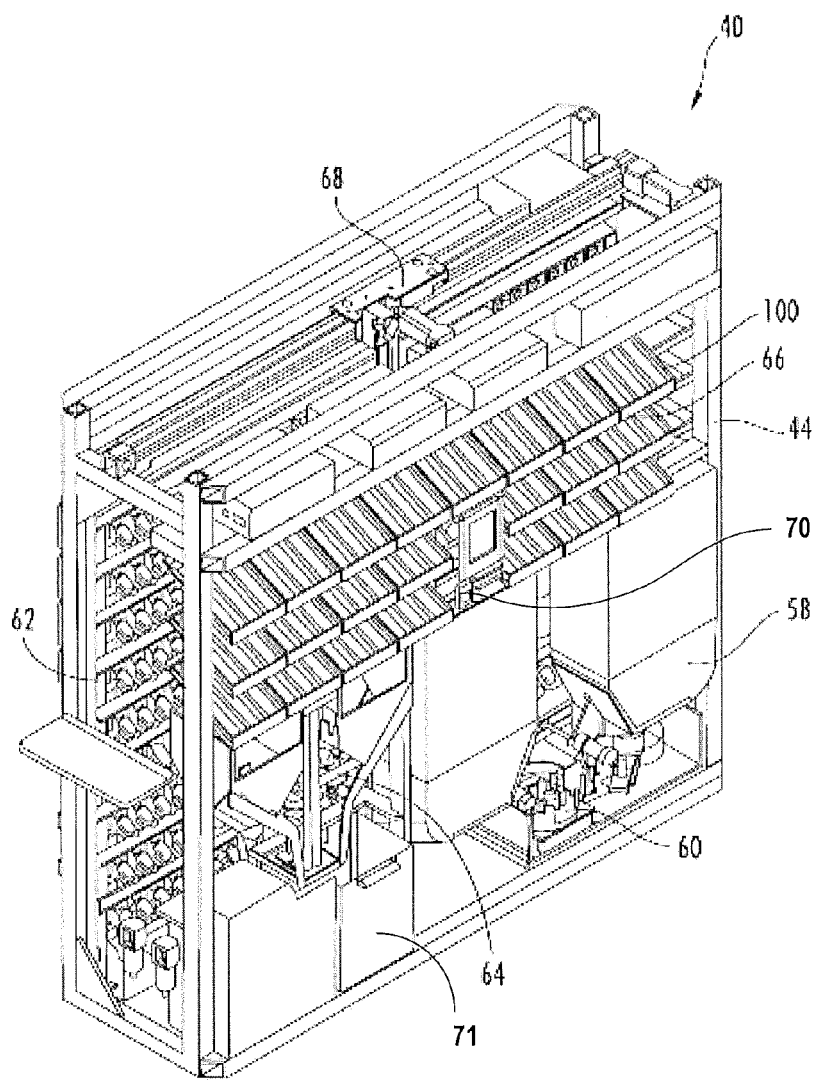
FIG. 3 is a top, rear perspective view of the system of FIG. 1 with the outer panel of the system removed to show the internal components.

As described in detail below, detection systems according to embodiments of the present invention may be used in automated pill dispensing systems to determine one or more physical characteristics of pill-containing vials, such as the presence or absence of the vial in an output chute, a color of the vial, a labeling status of the vial, and/or a fill level of the vial. An automated pill dispensing system according to some embodiments of the present invention is illustrated in FIGS. 2 and 3 and is designated broadly therein at 40. The system 40 includes a support frame 44 for the mounting of its various components. The system 40 generally includes a controller 42 (represented herein as part of a graphical user interface), a container dispensing station 58 including vial feeder chutes therein, a labeling station 60, a tablet dispensing station 62, a capping or closure station 64, an offloading station 66, an exception carousel 70, and an overflow bin 71. In the illustrated embodiment, containers, tablets and closures are moved between these stations with a single carrier 68; however, in some embodiments only a single carrier may be employed, or one or more additional carriers may be employed. The operation of the container dispensing station 58, the labeling station 60, the tablet dispensing station 62, the closure station 64, and the exception carousel 70 are described in, for example, U.S. patent application Ser. Nos. 11/599,526; 11/599,576; 11/679,850; 11/111,270; and 12/420,223, the disclosures of each of which are hereby incorporated herein in its entirety.

Figure 4A:
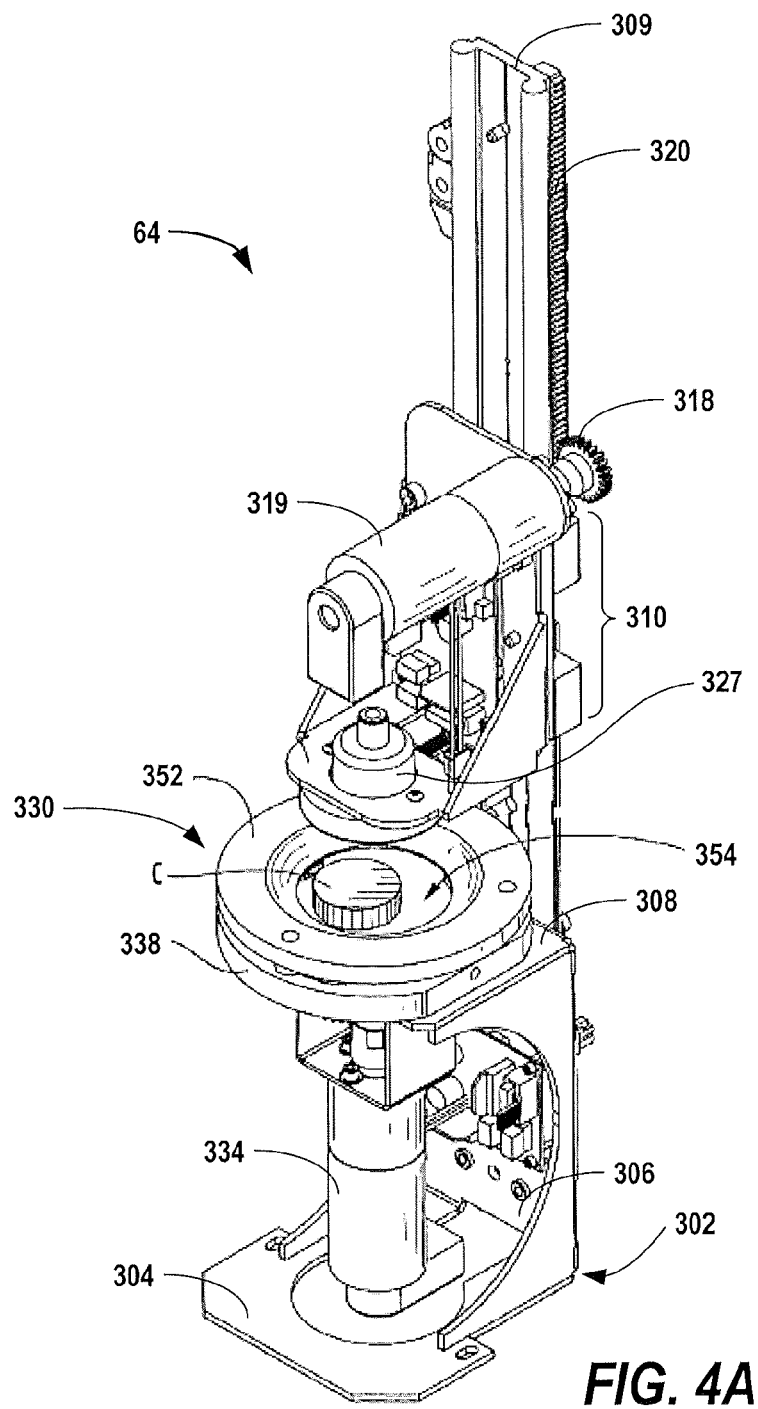
FIG. 4A is a front perspective view of a closure assembly of a pharmaceutical dispensing system according to some embodiments of the present invention.

As shown in FIG. 4A, the closure station 64 includes a frame 302 upon which other components are mounted. The frame 302 comprises a lower platform 304 that is mounted to the support frame 44 of the system 40. An upright support 306 extends upwardly from one end of the lower platform 304. An upper platform 308 extends in cantilever fashion from the upper end of the support 306 over the lower platform 304. An elevator mounting member 309 is fixed to the support 306 and extends upwardly therefrom. An elevator 310 is mounted to the rear surface of the support 306. A drive motor 319 is mounted on the front side of the elevator 310 opposite a drive pinion 318 and rotates the drive pinion 318 to move up/down a toothed rack 320 extending vertically on the back side of the elevator mounting member 309. A suction block 327 is mounted to a floor of the elevator 310. The block 327 includes a lower surface where a suction pad (not shown) is mounted. A centering assembly 330 is mounted to an upper platform 308 and the support 306 of the frame 302. A motor 334 is mounted to the frame 302 and is operable to rotate a main stage 338. An upper stage 352 including a large central aperture 354 is fixed to the upper surface of the main stage 338.

Still referring to FIG. 4A, the closure station 64 is free to receive a closure (i.e., a cap for a vial) from, for example, a closure dispensing station similar to that shown in U.S. Pat. No. 6,971,541 to Williams et al., or one similar to that shown in co-pending and co-assigned U.S. patent application Ser. No. 11/693,929, filed Mar. 30, 2007, and Ser. No. 12/015,007 filed Jan. 16, 2008. Once the closure C has been deposited in the aperture 354 (the presence of the closure C can be determined in different ways, such as detection by a sensor located in a closure delivery chute, the passage of a predetermined period of time, or the like), the controller 42 signals a drive motor 334 to rotate the main stage 338 such that clamps (not shown) contact the closure C; this can be determined based on a predetermined time period, a torque or position sensor, or the like. At this point the closure C should be centered in the aperture 354. Once the closure C is centered and rotation of the main stage 338 ceases, the controller 42 actuates the drive motor 319 to drive the elevator 310 downward to attach the closure C to the suction pad. After the closure C is attached to the suction pad (this can be verified with a vacuum contact switch or the like), the controller 42 activates the drive motor 319 to raise the elevator 310. The closure station 64 is then free to receive a vial from the carrier 68. The carrier 68 conveys the vial to the aperture 354 of the upper stage 352, which provides a receptacle for the vial. The controller 42 then signals the drive motor 334 to rotate the main stage 338 such that the clamps contact and substantially center the lower end of the vial. As a result, both the closure C and the vial are substantially centered by the same components. The controller 42 then activates the drive motor 319 to lower the elevator 310 until the closure C encloses the perimeter of the upper edge of the vial, and activates the drive motor 334 to rotate the main stage 338 to secure the closure C onto the vial. The controller 42 then signals the carrier 68 to retrieve the capped, filled vial for subsequent operations (such as offloading).

Figure 4B:
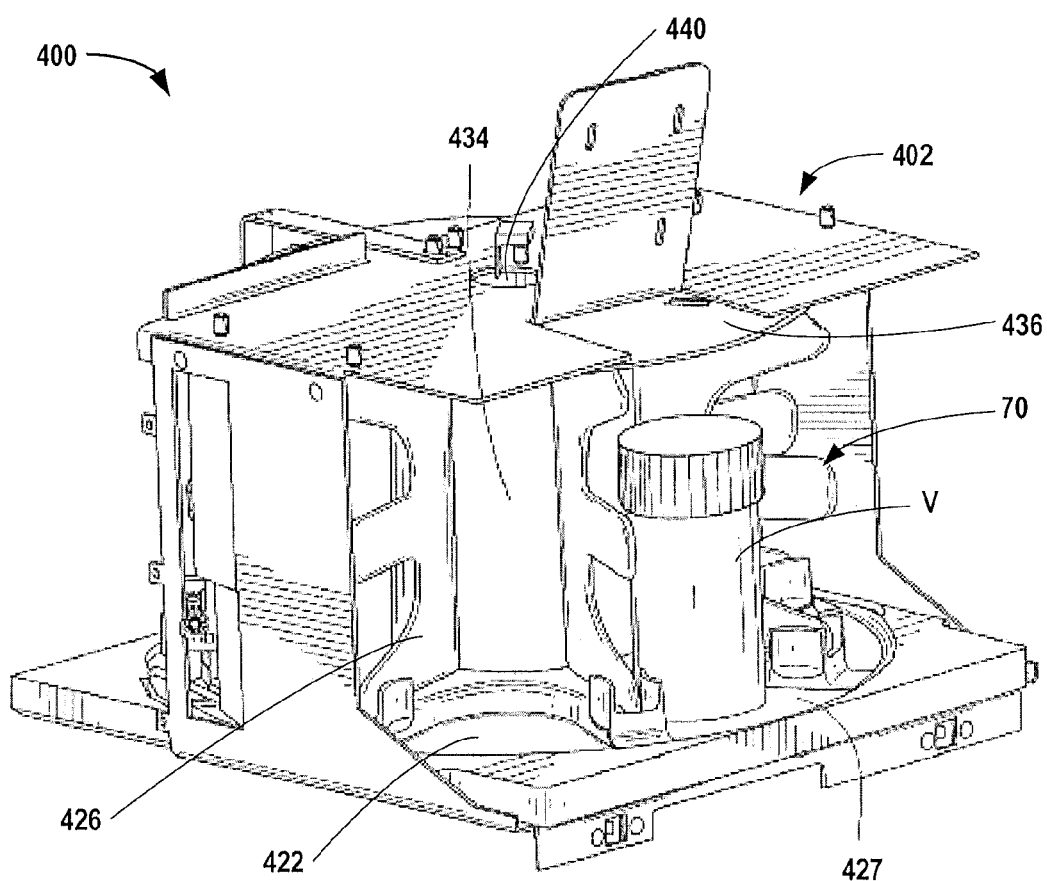
FIG. 4B is a front perspective view of an exception assembly of a pharmaceutical dispensing system according to some embodiments of the present invention.

Referring now to FIG. 4B, the exception carousel 70 is included in a vial exception assembly 400 located on the same side of the system 40 as the offload station 66 (see FIG. 3). The exception assembly 400 includes a frame 402, the carousel 70, and a motor 440. The carousel 70 includes a base 422, a cylindrical central cover 434 that houses the motor 440, and a top plate 436. The base 422, the top plate 436, the cover 434, and the partitions 426 form a plurality of compartments 427. Each of the compartments 427 is separated from adjacent compartments 427 by two partitions 426, which radiate outwardly from the cover 434. The compartments 427 are each operable to hold a vial V. The vials V that are deposited in the exception carousel 70 may be "exceptions," which are vials that are unsuitable for distribution to customers. Potential reasons for exceptions include an incorrect number of tablets in the vial, incorrect or inadequate labeling, an uncapped or loosely capped vial, and the like.

Still referring to FIG. 4B, in operation, the controller 42 signals the motor 440 to rotate the carousel 70 such that the carousel 70 presents a compartment 427 to the interior of the system 40, such that the carrier 68 can deliver a vial (presumably an exception vial) to the compartment 427. The presence of the vial V in the compartment 427 can be detected by sensors (not shown), which provide this information to the controller 42, for example, to signal for removal of the vial V from the system 40. In some embodiments, the controller 42 may signal the motor 440 to rotate the carousel 70 such that the compartment 427 that houses the exception vial V moves away from an entry opening (not shown) and another one of the compartments 427 moves into position behind the entry opening. In this position, the next compartment 427 can receive a second exception vial. This process can (but need not) be repeated until each of the compartments 427 houses an exception vial, and the controller 42 may then signal for removal of the exception vials.

Figure 4C:
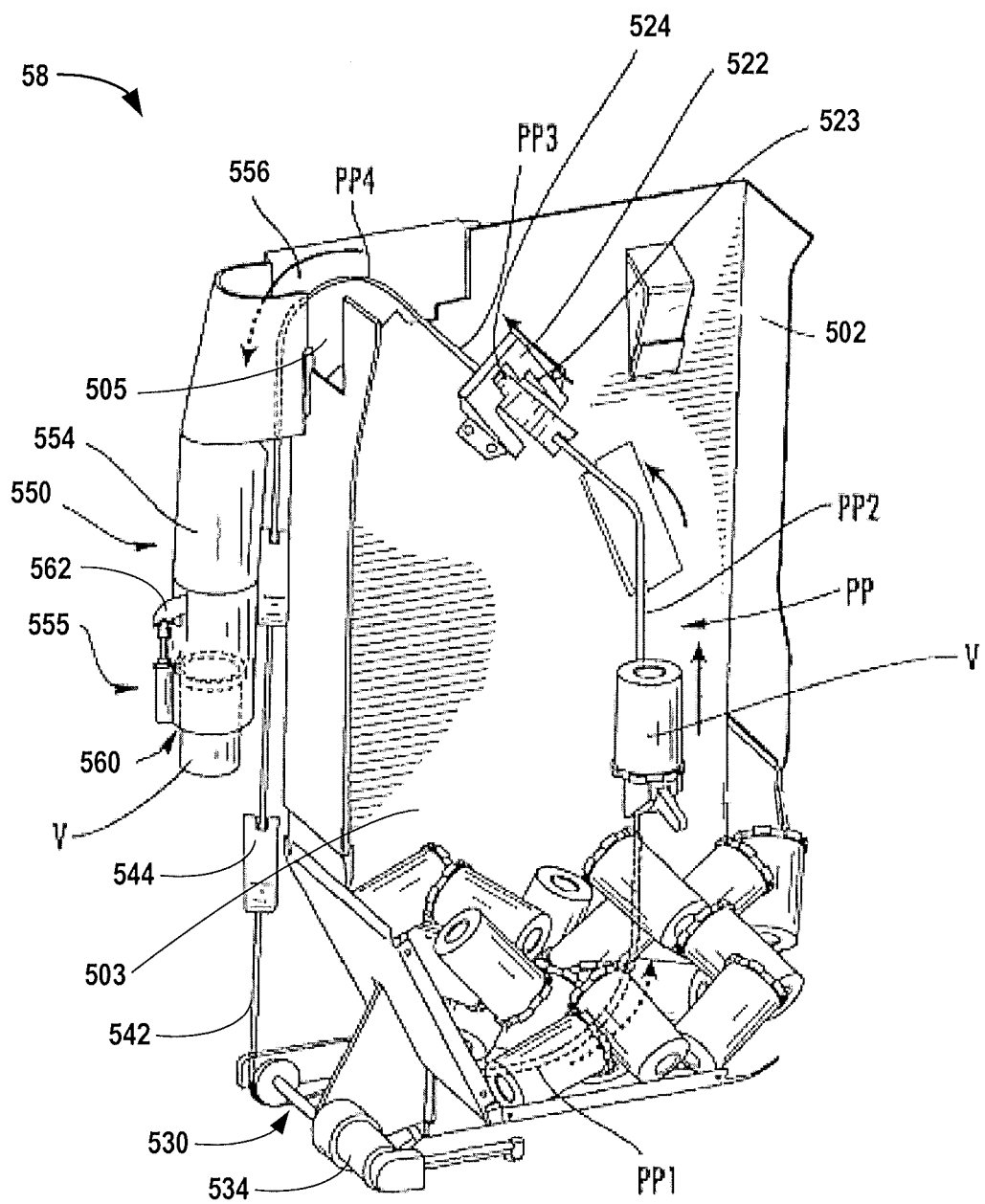
FIG. 4C is a cutaway view of a vial dispenser of a pharmaceutical dispensing system according to some embodiments of the present invention.

Referring now to FIG. 4C, the container dispensing station 58 includes a housing 502, a drive unit 530, a vial pick-up unit 544, a vial feeder or delivery chute 550, and a capture mechanism 555. In operation, vials are initially loaded into a cavity 503 of the housing 502. When a prescription is received, and the operator enters the prescription information, the controller 42 signals the container dispensing station 58 that a vial is needed. This signal activates the drive unit 530 to drive a chain 542 around a chain path. As the chain 542 moves, fingers 544 attached thereto also move along the pick-up path PP in a counterclockwise direction. As the fingers 544 travel along the pick-up path, projections thereof may pick-up or capture a vial V whose open end is coincident with the pick-up path of the fingers 544. After a finger 544 has captured the vial V, it proceeds on the pick-up path PP through the upward and angled runs PP2, PP3. As the finger 544 travels on the angled run PP3, it passes through the aperture 523 of the exit gate 522. The aperture 523 is sized such that a vial V of the proper size can pass therethrough, but a vial of an improper larger size cannot. The finger 544 then proceeds from the angled run PP3 to the drop-off loop PP4. As the finger 544 reaches the descending portion of the drop off loop PP4 and begins to point downwardly, the vial V can slip off of the finger 544 and travel through the finger exit window 505 and the cutaway portion 556 of the tube 554 into the vial feeder chute 550.

Still referring to FIG. 4C, in some embodiments, the capture mechanism 555 may be used to "pre-stage" vials in the chute 550 in order to coordinate dispensing of vials with other operations of the system 40. For example, the capture mechanism 555 can release a previously captured vial V from the delivery chute 550 for use in filling a prescription, then capture a next vial V after it has been deposited in the delivery chute 550. In particular, the capture mechanism 555 includes a capture member 562 extending through a slot in the chute 550. The presence of the vial V in the chute 550 is detected by a sensor (not shown) located adjacent and just above the capture member 562 (although any number of locations for the sensor may be employed), which signals the controller 42 that a vial is present and in position for subsequent dispensing. The vial V remains in this position until the controller 42 signals the capture mechanism 555 to release the vial by manipulating the capture member 562, thereby enabling the vial V to drop through the lower portion of the dispensing chute 550 and out of the outlet 560.

Figure 4D:
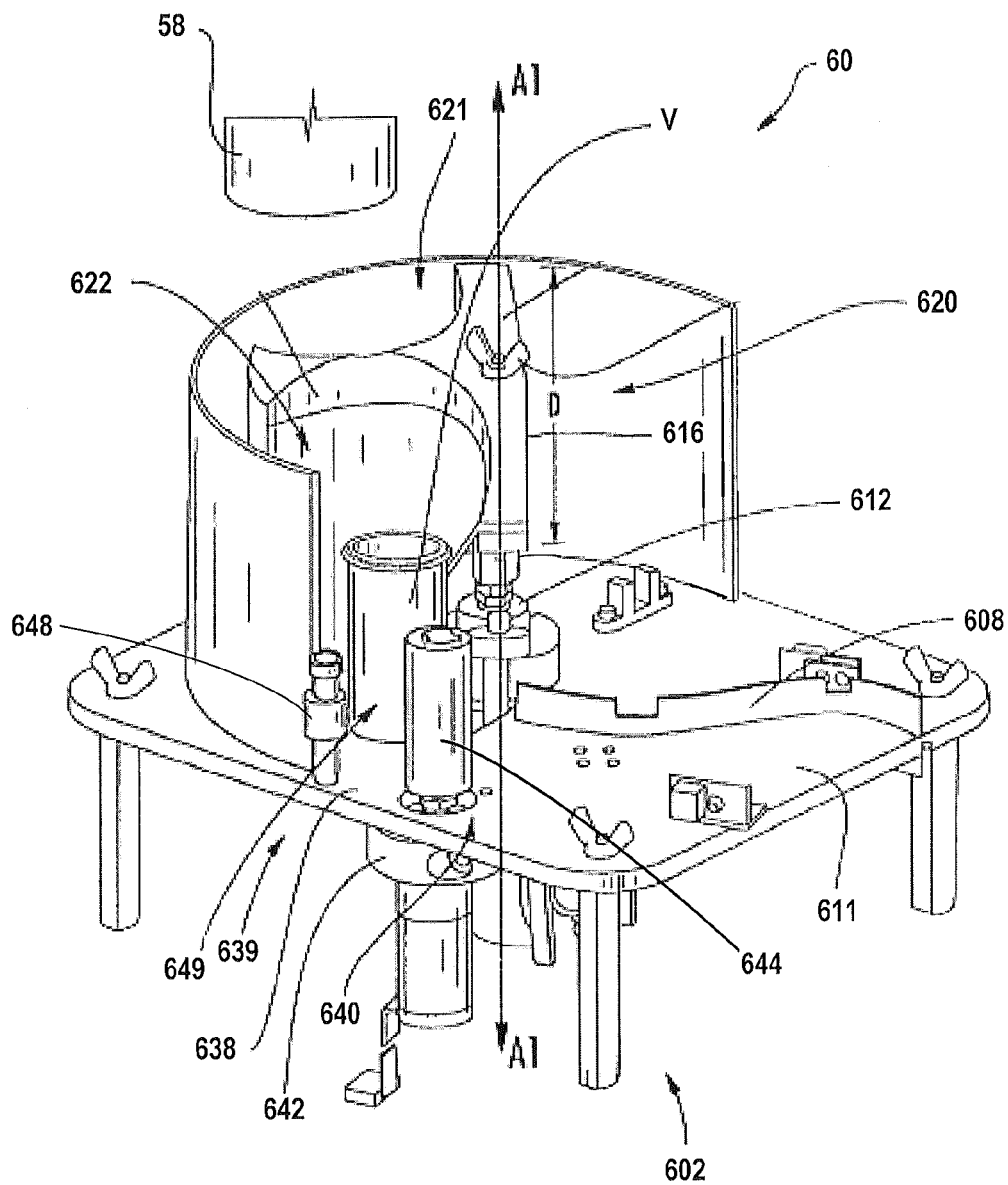
FIG. 4D is a front perspective view of a vial labeling station of a pharmaceutical dispensing system according to some embodiments of the present invention.

As shown in FIG. 4D, the labeling station 60 includes a base 602, an index member assembly 620, and a labeling assembly 639. In operation, the controller 42 receives an order for a prescription and signals the container dispensing system 58 of FIG. 4C to dispense a vial of a desired size. A small vial (such as the vial V shown in FIG. 4D) may be deposited into the small vial compartment 622, while a larger vial may be deposited in the large vial compartment 621. Once the vial V has entered the small vial compartment 622, the controller 42 signals the index motor 612, which activates and rotates the index member 616 about the axis A1 to push the vial V to the labeling section 638 such that the vial V is forced against the idler roller 648 and the drive roller 644. After the vial V is engaged by the rollers 644 and 648, the controller 42 signals the motor 642 of the drive roller unit 640 to rotate the drive roller 644. Also, the controller 42 signals a label source (not shown) to print and present a label into the label gap 649 adjacent the drive roller 644. The label has an adhesive applied to the surface thereof that faces the side wall of the vial V and therefore adheres thereto. The rotation of the drive roller 644 causes the vial V to rotate, which rotation draws the label onto the side wall of the vial V. Once the label has been completely applied to the vial V, the controller 42 signals the index motor 612 to rotate the index member 616 such that the small vial compartment 622 pushes the vial V initially in a direction normal to the surface of the drive roller 644, which enables the vial V to reach and travel along a path defined by the exit guide 608 to the pick-up area 611.

Figure 4E:
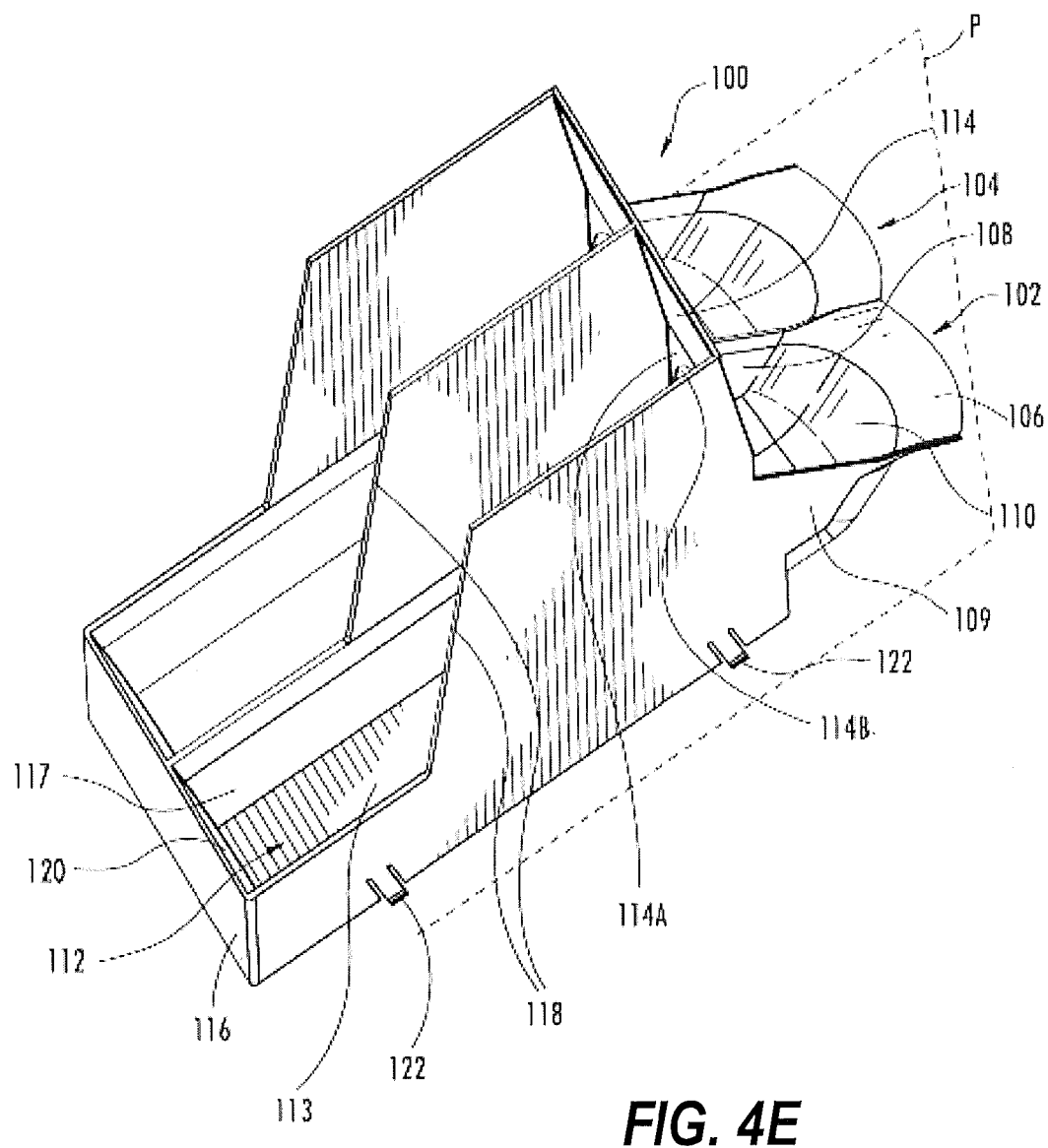
FIG. 4E is an isometric view of an offload chute unit of the pharmaceutical dispensing system according to some embodiments of the present invention.

Turning again to FIG. 3, the offload station 66 includes a number of chute units 100, each of which, in the illustrated embodiment of FIG. 4E, includes two offload or output chutes 102, 104, although those skilled in this art will appreciate that a chute unit may include only a single chute or may include more than two chutes. Also, the offload station 66 may include only a single chute unit or any appropriate number of chute units.

As shown in FIG. 4E, the chutes 102, 104 are substantially identical mirror images of each other about a vertical plane P. As such, only the chute 102 will be described in detail herein, with the understanding that the description is equally applicable to the chute 104. For the purpose of this discussion, the terms "front," "forward" and derivatives thereof refer to the direction that a pharmaceutical vial travels in the chute 102, i.e., from right to left from the vantage point of FIG. 4E. The terms "rear", "back" and derivatives thereof refer to the direction that is opposite of the "forward" direction, i.e., from left to right from the vantage point of FIG. 4E. One may also think of the forward direction as extending "downstream" from the top to the bottom of the chutes 102, 104 and the rearward direction as extending "upstream" from the bottom to the top of the chutes 102, 104.

Referring again to FIG. 4E, the chute 102 has a rear lip 106 that resides above the frame 44. The lip 106 includes a shallow arc such that it is slightly concave. The lip 106 merges smoothly at its front end with a concave ramp 110. Side walls 108, 109 rise from the lateral edges of the ramp 110, with the forward ends of the side walls 108, 109 being higher than the rearward ends. The effect of the configuration provided by the lip 106, the ramp 110 and the side walls 108, 109 is that of a half-bowl that drains downwardly into the remainder of the chute 102. The lower portion of the ramp 110 rests on the frame 44.

Figure 5A:
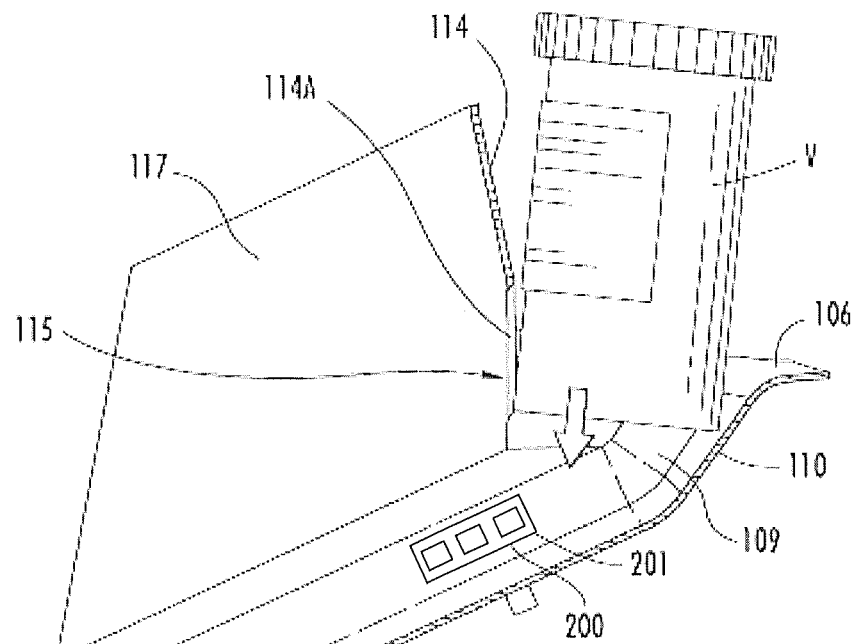
FIGS. 5A-5E are sequence views illustrating vials traveling through the chute unit of FIG. 4E according to some embodiments of the present invention.
Figure 5B:
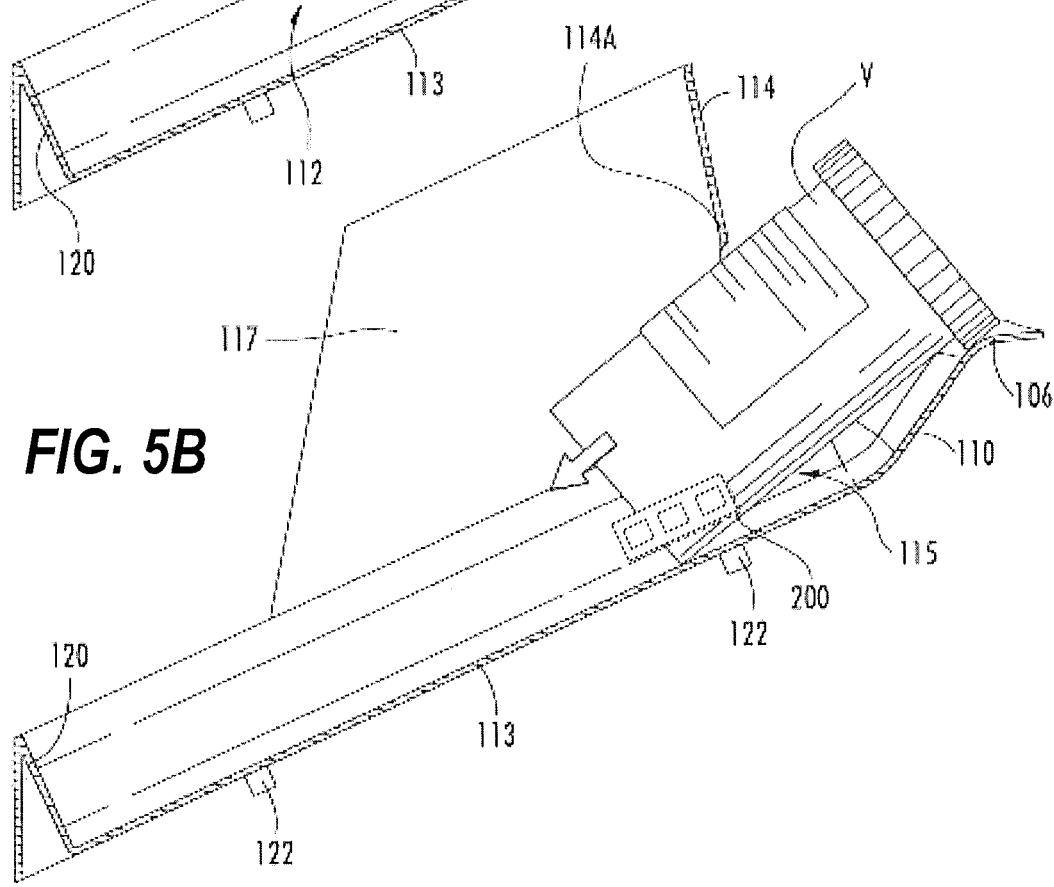
Figure 5C:
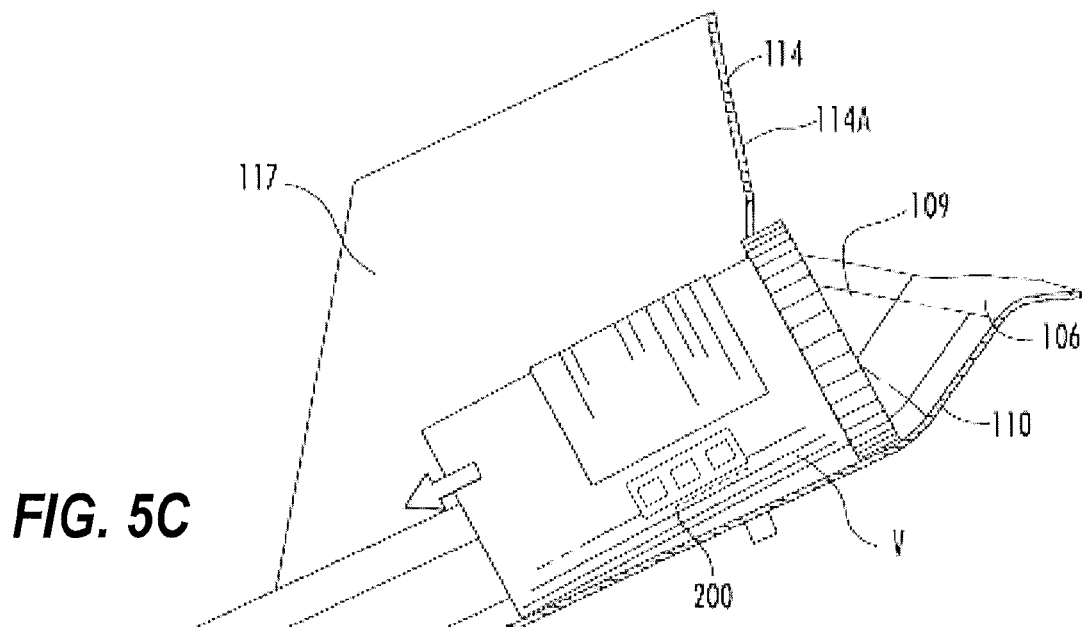

Still referring to FIG. 4E, a trough 112 having an arcuate profile extends forwardly and downwardly from the front end of the ramp 110. The trough 112 includes a concave floor 113 that is bounded at its lateral edges by dividers 116, 117. A rear wall 114 rises above the rear end of the trough 112; the bottom portion 114a of the rear wall 114 angles rearwardly and has an arcuate lower edge 114b that, in combination with the rear end of the floor 113, forms an inlet 115 configured to accept a pill-containing vial (see FIG. 5A). At their rearward ends, the dividers 116, 117 are similar in height to the rear wall 114. Each of the dividers 116, 117 has a leading edge 118 that slopes sharply downward in a central portion of the divider 116, 117, such that the forward portion of the divider 116, 117 is relatively low. A front wall 120 spans the front ends of the troughs 112 and provides a landing area for vials. The front wall 120 may have a foam or other shock absorbent material attached thereto to reduce any rebound effect of the vial dropping down the chute 102 and striking the front wall 120.

The chute unit 100 is attached to the frame 44 via four latches 122. The latches 122 are inserted into mating apertures (not shown) in the frame 44. In the illustrated embodiment, the chute unit 100 is mounted so that the troughs 112 slope downwardly from back to front; for example, the chute unit 100 may be mounted such that the trough 112 is angled relative to a horizontal plane at an angle of between about 20 and 35 degrees. Accordingly, when a vial is inserted into the inlet 115, the vial travels downwardly from the back of the chute 102, and comes to rest at the front wall 120 of the chute 102, as discussed in greater detail below with reference to FIGS. 5A-5E.

Referring now to FIGS. 5A-5E, in operation, after a vial V has been dispensed, labeled, filled and capped, it is transported by the carrier 68 to the offload station 66 to be deposited in one of the chutes, also referred to herein as a "depositing event." The carrier 68 deposits the vial V "right-side up" into the half-bowl formed by the lip 106, the side walls 108, 109, and the ramp 110 (see FIG. 5A); the angled bottom portion 114a of the rear wall 114 can also assist in funneling the vial V into position. In some embodiments, the dimensions of the lip 106, ramp 110, side walls 108, 109 and bottom portion 114a of the rear wall 114 are selected to ensure that a "right side up" vial V presented by the carrier 68 exits the "half-bowl" with the lower (i.e., non-capped) end leading the upper, capped end, irrespective of which of multiple common vial sizes is presented (see FIG. 5B). Typically, the length of a capped vial V is between about 2 and 4 inches, and the diameter is between about 1.25 and 2.0 inches. In some embodiments, the distance between the side walls 108, 109 is between about 2.5 and 2.75 inches, the ramp 110 has a depth of about 1.5 to 2.0 inches, the distance from the rear edge of the ramp 110 to the rear edge of the bottom portion 114a of the rear wall 114 is between about 3.25 and 3.5 inches, and the ramp 110 generally forms an angle of between about 20 and 30 degrees relative to an underlying horizontal surface.

Once the vial V enters the half-bowl formed by the ramp 110, the side walls 108, 109 and the lip 106, the vial V, oriented "non-capped end down", slides through the inlet 115 (see FIG. 5C) and down the trough 112 to the front wall 116 (see FIG. 5D), where it rests until pharmacy personnel remove it. In some embodiments, the chute 102 may be configured to hold at least two vials V1, V2 at once in a stacked arrangement (see FIG. 5E). As such, the trough 112 may have a length of between about 9 and 10 inches in some embodiments, which enables two vials 4 inches in length to be stored and accessible for pharmacy personnel. However, in other embodiments, the chute 102 may have a length sufficient to store fewer or more vials. Also, in other embodiments, the inlet 115 may be configured to accept "sideways" insertion of vials, such that a vial may rotate about its long axis to roll down the chute 102. Also, vials of different sizes can be stored in chutes 102, 104. A machine with similar capabilities is described in U.S. patent application Ser. No. 11/755,249, the disclosure of which is hereby incorporated by reference herein in its entirety.

As shown in FIGS. 5A-5E, the chute unit 100 further includes an optical sensor 200 as illustrated in FIGS. 1A-1B in each of the chutes 102, 104. The optical sensor 200 includes a plurality of optical emitter elements 201, such as light-emitting diodes (LEDs), and an optical detector 202 configured to be operated cooperatively to output a detection signal. In particular, the optical emitters 201 are configured to output optical signals having respective signatures, and the optical detector 202 is configured to receive at least a portion of the optical signals emitted from the optical emitter elements 201 and output an electrical detection signal representative of the portion of the received optical signals. In the illustrated embodiments, the optical sensor 200 is illustrated as a beam-break-type optical sensor that detects physical characteristics of an object placed between the emitters and the detector; however, it is to be understood that other types of optical sensors (for example, reflective-type sensors that detect physical characteristics based on reflection of the optical signals by the object back toward a detector located alongside the emitter and/or inference type-sensors that may be used to infer the position of an object based on known positions of the emitter elements) may be used in other embodiments.

Figure 5D:
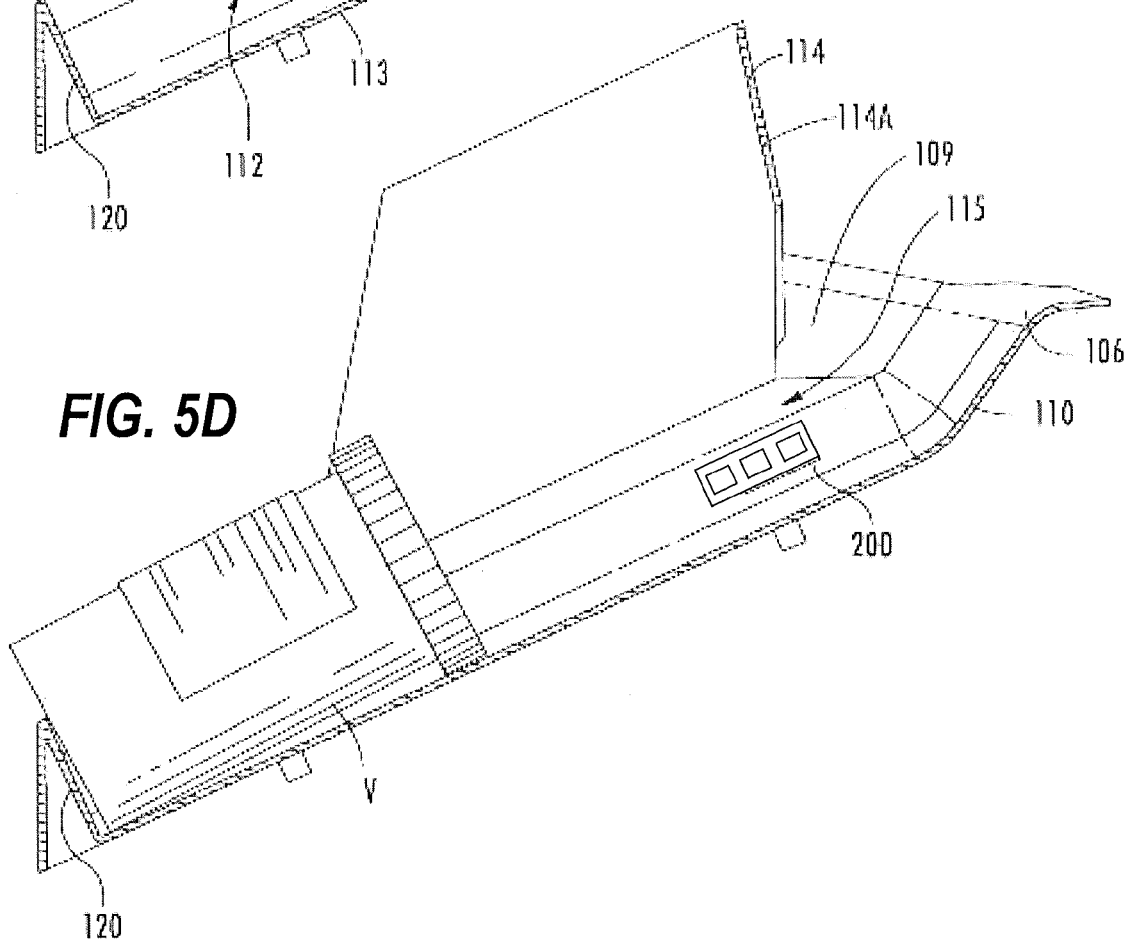

For example, as shown in FIG. 5D, when only a single vial V is present in the chute 102, the portion of the chute 102 adjacent the optical sensor 200 is vacant. As such, the optical emitters 201 output respective optical signals which are not blocked by a vial, and thus, most (if not all) of the optical signals are received by the optical detector 202. In response, the optical detector 202 outputs a detection signal representative of the intensity of the received optical signals, which indicates an absence of a vial in the chute 102 at the location of the optical sensor 200. The system 40 may thereby detect that the chute 102 is not full, and may control a next depositing event by directing the carrier 68 to continue to deposit vials into the chute 102 in response to the signal from the optical sensor 200. The system 40 may also alert a pharmacist in response to determining a color of the vial V, a labeling status of the vial V (e.g., labeled or not labeled), and/or provide other messages to the operator via the user interface in response to the signal from the optical sensor 200. For example, the system 40 may alert a pharmacist to take corrective action when the signal from the optical sensor 200 indicates that a vial is unlabeled or incorrectly labeled.

Figure 5E:
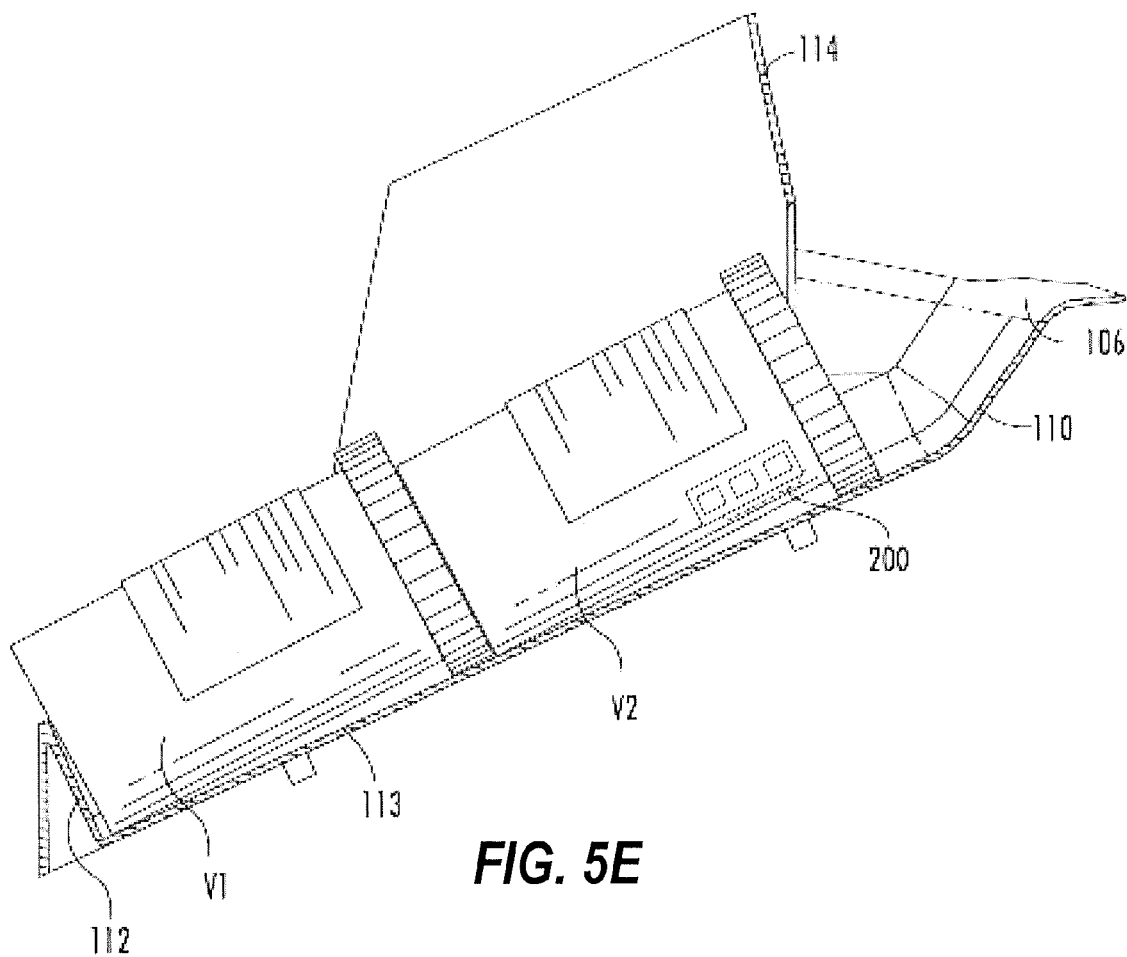

In contrast, as shown in FIG. 5E, two vials V1, V2 are present in the chute 102, such that the portion of the chute 102 adjacent the optical sensor 200 is occupied. Accordingly, the optical signals output from the optical emitters 201 are at least partially blocked by the vial V2, and portions of the optical signals may not be received at the optical detector 202. The degree of absorption of the optical signals by the vial V2, and thus, the intensities of the optical signals received at the optical detector 202, may depend on several factors, such as the color of the vial V2 relative to the color(s) of the light emitted by the optical emitters 201, and whether the vial V2 is opaque or transparent, full or empty, and/or labeled or unlabeled. In response to receiving portions of the optical signals output from the optical emitters 201, the optical detector 202 outputs a detection signal representative of the intensities of the received optical signals, which may be analyzed to determine one or more physical characteristics of the vial in the chute 102 at the location of the optical sensor 200, as discussed in greater detail below with reference to FIGS. 7A-10B. For example, where the detection signal indicates a presence of the vial V2 in the chute 102, the system 40 may thereby detect that the chute 102 is full, and may direct the carrier 68 to stop depositing vials into the chute 102 in response to the signal from the optical sensor 200. The system 40 may also direct the carrier 68 to deposit vials to an alternate chute and/or provide a visible/audible alert signal to the pharmacy personnel indicating that the chute 102 is full.

Although illustrated above as being implemented in an output chute 102 of an offload station 66 by way of example, it will be understood that optical sensors 200 according to embodiments of the present invention may be implemented in any receptacle that is configured to hold one or more vials V in one or more of the various internal stations of the pill-dispensing system 40. For example, the optical sensor 200 may be implemented in the closure station 64 to determine whether a vial V has been correctly filled and/or labeled prior to capping the vial V and providing the vial V to the offload station 66. Likewise, the optical sensor 200 may be implemented in the exception carousel 70 to determine that a vial V is unsuitable to be delivered to customers and/or the reason therefor (for example, due to incorrect fill level and/or incorrect labeling). The optical sensor 200 may also be implemented in the container dispensing station 58 to determine whether a vial V selected for filling is the correct size and/or color, in vial sensors in the labeling station 60 to determine whether a vial is correctly labeled, and/or in the overflow bin 71 to determine when the overflow bin 71 is full. Due to the unique signatures provided by emitter elements of the optical sensors 200, the above and other conditions within the pill-dispensing system 40 may be detected with relative immunity to ambient light.

Figure 6A:
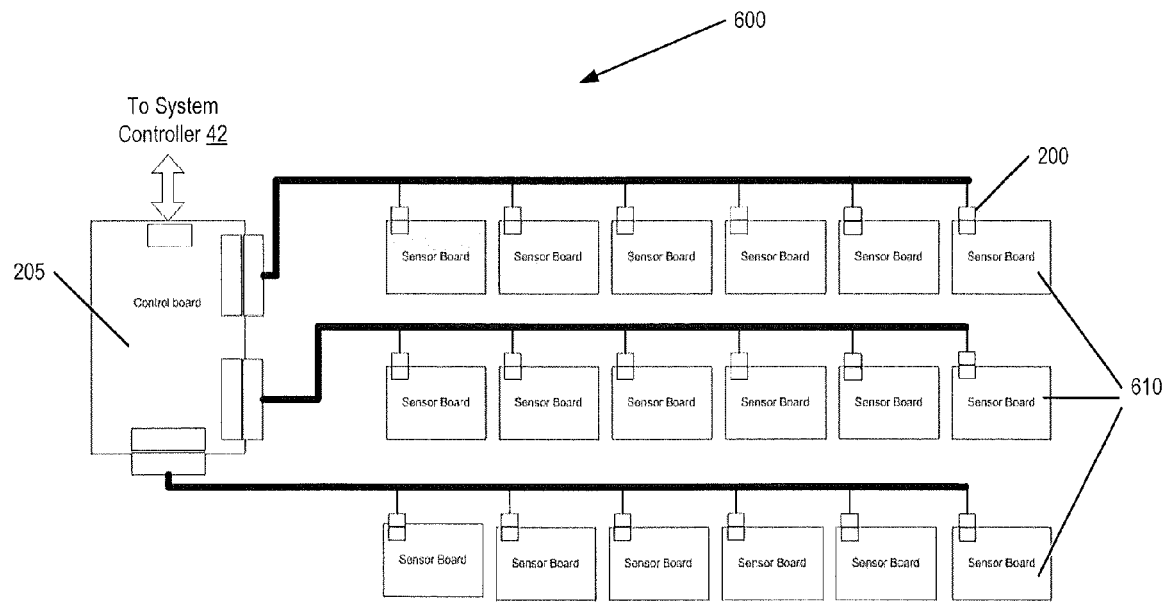
FIG. 6A is schematic diagram illustrating a system for communication between a controller circuit board and a plurality of sensor circuit boards in accordance with some embodiments of the present invention.

FIG. 6A illustrates communication between the optical sensors 200 in each of the chutes and a controller 205 according to some embodiments of the present invention. As shown in FIG. 6A, the communication system 600 includes a controller circuit board 205 and a plurality of sensor circuit boards 610. The controller circuit board 205 is communicatively coupled to (and/or may be implemented as a part of) a system controller, such as the controller 42 of FIG. 1. The sensor boards 610 are each coupled to an optical sensor 200, which may be located in each output chute as illustrated in FIGS. 5A-5E. However, those skilled in the art will appreciate that a sensor board 610 may be coupled to more than one optical sensor in some embodiments, and more than one optical sensor 200 may be located in each output chute.

In particular, as shown in FIG. 6A, each sensor circuit board 610 includes the optical sensor 200, and is mounted with the sensor 200 at a specific location in each output chute such that the controller circuit board 205 can detect one or more physical characteristics of a vial at a particular location based on the detection signal output from the sensor 200 at the particular location. In the embodiments described herein, the optical sensor 200 is an infrared (IR) beam-break type sensor. The optical sensor 200 may be provided in a surface mount package and may be located in each chute adjacent to the resting location of the vial that is to be detected. Thus, when a vial is located next to the sensor 200 in the chute, the optical signal provided from the emitter 201 will be at least partially blocked based on the physical characteristics of the vial. The portion of the light received at the detector 202 will cause the detector 202 to generate a voltage relative to the brightness of the light received. This voltage is provided as an electrical detection signal that is output to the controller circuit board 205 to be read and analyzed.

Still referring to FIG. 6A, the control circuit board 205 includes signal processing components for detecting a vial in a chute. Each chute sensor 200 is connected back to the controller circuit board 205 via its respective sensor circuit board 610 so that its detection signal may be read. Accordingly, detection signals from the sensors 200 in each output chute are relayed back to the controller board 205 via the sensor boards 610. In some embodiments, the controller circuit board 205 may include the LED driver outputs for controlling the driver circuits 203 to activate the optical emitters 201 and the analog signal inputs to read the signals output from the detectors 202. In particular, the controller board 205 may include a microcontroller configured to communicate with the optical sensor 200 in each chute. The firmware on this board 205 may control the timing of the activation of the emitters 201 of the sensors 200, the timing of the activation of the detectors 202 and/or the reading of the detection signals therefrom, as well as additional filtering of the detection signals, as discussed above with reference to FIGS. 1A-1B. The controller circuit board 205 may thereby provide the status of any one chute and/or physical characteristics of a vial contained therein to the main system controls responsive to analysis of the corresponding detection signal.

Figure 6B:
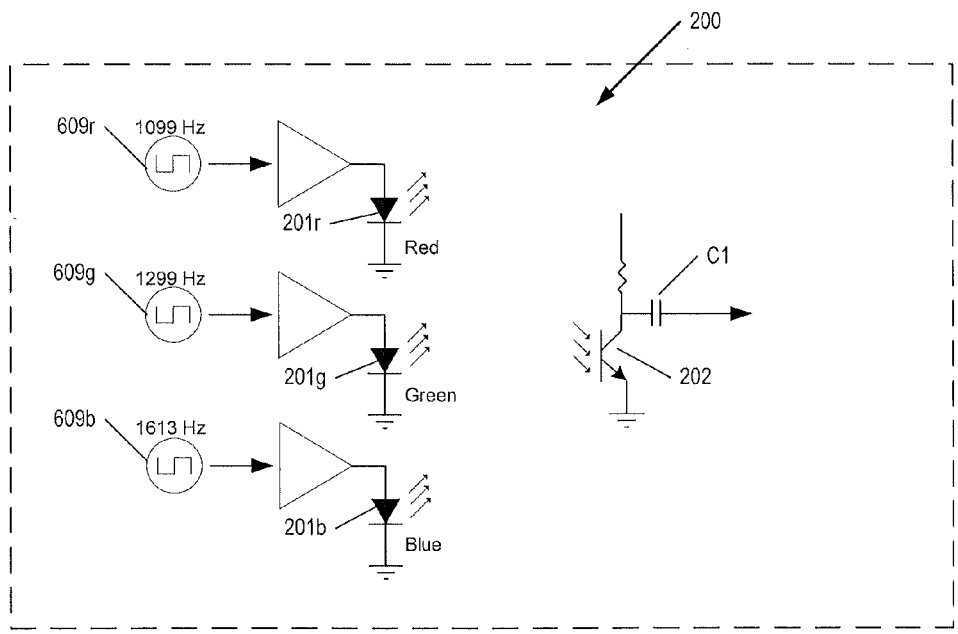
FIG. 6B is a schematic diagram illustrating an optical sensor of one of the sensor boards of FIG. 6A.

FIG. 6B illustrates an example implementation of an optical sensor 200 according to some embodiments. As shown in FIG. 6B, the sensor 200 includes three emitter elements 201r, 201g, and 201b, and a single detector 202. A different control signal (shown in FIG. 6B as square wave switching functions 609r, 609g, and 609b) is provided to modulate the optical signals output from each of the emitter elements 201r, 201g, and 201b. In particular, the red emitter element 201r is operable to emit an optical signal in the red wavelength range (e.g., about 600 nanometers (nm) to about 720 nm) in response to a first switching function 609r having a frequency of about 1099 Hz, the green emitter element 201g is operable to emit an optical signal in the green wavelength range (e.g., about 495 nm to about 570 nm) in response to a second control signal 609g having a frequency of about 1299 Hz, and the blue emitter element 201b is operable to emit an optical signal in the blue wavelength range (e.g., about 440 nm to about 495 nm) in response to a third control signal 609b having a frequency of about 1613 Hz. However, the control signals 609r, 609g, and 609b may be tuned to work with any desired sensor switching speed, for example, to modulate the light output of the emitter elements 201r, 201g, and 201b to provide signatures that are easily distinguishable over ambient light sources running on 60 Hz wall power, regardless of the color of light emitted by the emitter elements 201r, 201g, and/or 201b.

The detector 202 may be a broad spectrum detector (such as the detector 321-005B used in the Max® system sold by the assignee of the present application) operable to output a detection signal representing the collective light output received from the three emitter elements 201r, 201g, and 201b. However, in other embodiments, the detector 202 may include a plurality of detector elements, and the detection signal may represent a combination of a plurality of detection signals output from respective ones of the plurality of detector elements. As shown in FIG. 6B, the output of the detector 202 is powered at about 4.5V and AC coupled (via capacitor C1) to a spectrum analyzer, which samples the detection signal with a sampling frequency $v_s$ that is at least twice the highest frequency that is present in the signal, and provides a frequency domain transformation of the detection signal to produce the power spectra shown in the example waveforms of FIGS. 7B, 8B, 9B, and 10B.

FIGS. 7A-10B illustrate the different possible receptacle conditions, as well as the frequency representations of the detection signals provided from the sensor 200 in response thereto, according to some embodiments of the present invention. In particular, the waveforms of FIGS. 7B, 8B, 9B, and 10B illustrate power spectral densities representing the overall light emission from optical emitter elements 201r, 201g, and 201b that is received at an optical detector 202 for the following possible states of the output chute 102 or other receptacle: no vial present adjacent the sensor 200 (FIG. 7A); an unlabeled, partially-filled amber transparent vial present adjacent the sensor 200 (FIG. 8A); a labeled red transparent vial present adjacent the sensor 200 (FIG. 9A); and an unlabeled, empty green transparent vial present adjacent the sensor 200 (FIG. 10A). The optical emitter elements 201r, 201g, and 201b are located opposite the optical detector 202 in the chute 102. The frequency and/or duty cycle of the switching control signals provided to the emitter elements 201r, 201g, and 201b may be varied according to the particular conditions of operation. Although switching functions are used, the Fourier series for a square wave shows that there is power in the fundamental frequency, as demonstrated in the infinite series:

$$x_{square}(t) = \frac{4}{\pi}\sum_{k=1}^{\infty}\frac{\sin((2k-1)2\pi ft)}{(2k-1)} = \frac{4}{\pi}\left(\sin(2\pi ft) + \frac{1}{3}\sin(6\pi ft) + \frac{1}{5}\sin(10\pi ft) \ldots\right)$$

Figure 7B:
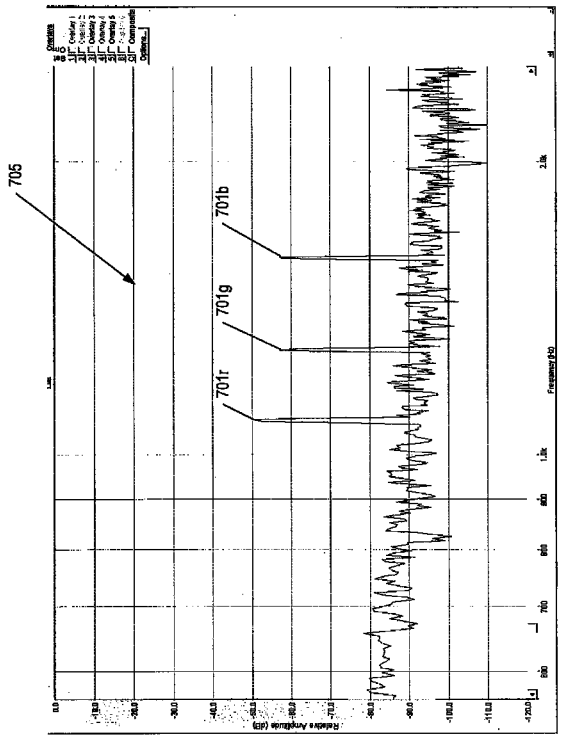
FIGS. 7A-7B illustrate chute conditions and detection signals when a vial is not present adjacent to the sensor in a chute unit.
Figure 7A:
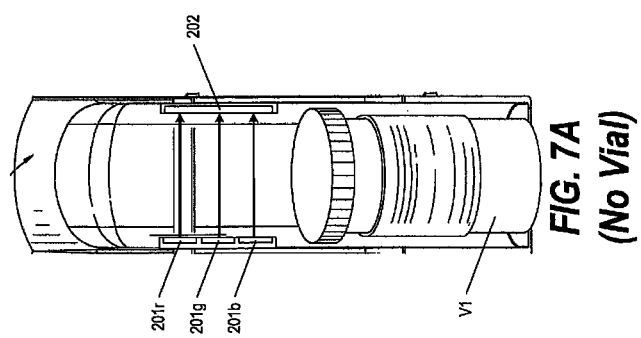

Referring now to FIG. 7A, a vial V1 is at the bottom or front of the chute 102, but no vial is present in the chute 102 adjacent to the sensor 200. As such, the optical signals output by the optical emitter elements 201r, 201g, and 201b are not reflected, blocked, and/or absorbed by a vial based on its physical characteristics, and thus, the respective intensities of the optical signals received at the optical detector 202 are relatively high. As such, the optical detector 202 outputs a detection signal, which is analyzed as shown in FIG. 7B to provide a frequency domain representation 705 illustrating the power spectral density (PSD) for the combined red, green, and blue light output. The frequency domain representation 705 thereby indicates baseline signal strengths or power levels for red, green and blue subcarriers 701r, 701g, and 701b at the frequencies of the red, green, and blue control signals 609r, 609g, and 609b, respectively, when no vial is present in the chute 102. The red, green and blue subcarriers 701r, 701g, and 701b may thereby provide representations of the respective control signals 609r, 609g, and 609b in the signal 705. In particular, the spectrum analyzer plot 705 of FIG. 7B shows the fundamental tones of the three subcarriers 701r, 701g, and 701b recovered from the modulated light output of the red, green and blue emitters 201r, 201g, and 201b, respectively (from left to right). Note that, in the example waveform 705 of FIG. 7B, the amplitude of the red subcarrier 701r is approximately 8 decibels (dB) higher than the amplitudes of the green and blue subcarriers 701g and 701b, due primarily to an imbalance in the output levels of the emitter elements 201r, 201g, and 201b in this example. However, it will be understood that such an imbalance may be reduced and/or eliminated by altering the driver circuit 203 to balance the output levels of the emitter elements 201r, 201g, and 201b.

Referring now to FIG. 8A, a vial V1 is at the bottom or front of the chute 102, and an amber-colored vial V2 is present in the chute 102 adjacent to the sensor 200. As such, portions of the optical signals output by the optical emitter elements 201r, 201g, and 201b are transmitted through the vial V2 to the optical detector 202, and thus, the respective intensities of the optical signals received at the optical detector 202 are affected based on the physical characteristics of the vial V2. The optical detector 202 thereby outputs a detection signal representing the portions of the light received after passing through the amber prescription vial V2. As shown in FIG. 8B, the detection signal is analyzed to provide a frequency domain representation 805 indicating the relative amplitudes of the red, green and blue subcarriers 801r, 801g, and 801b at the frequencies of the red, green, and blue control signals 609r, 609g, and 609b, respectively. In particular, the spectrum analyzer plot 805 of FIG. 8B shows that the amplitude of the red subcarrier 801r is attenuated by approximately 5 dB, the amplitude of the green subcarrier 801g is attenuated by approximately 15 dB, and the amplitude of the blue subcarrier 801b is attenuated by approximately 25 dB relative to the signal 705 of FIG. 7B (e.g., the baseline signal where no vial is present adjacent to the sensor 200). The signals 705 and 805 also represent the presence of ambient fluorescent lighting at a level that may be typical in an office environment. Accordingly, a controller circuit may determine that the vial V2 in the output chute 102 is amber-colored based on the relative attenuation of the subcarriers 801r, 801g, and 801b in the signal 805. The controller circuit may also determine that the vial V2 is unlabeled and partially-filled (below the position of the emitter element 201*g*) based on the relative attenuation of the subcarrier 801*b* (due to at least partial blockage of the optical signal from the emitter element 201*b*) as compared to the other subcarriers 801*r* and 801*g* in the signal 805.

Referring now to FIG. 9A, a vial V1 is at the bottom or front of the chute 102, and a red-colored vial V2' is present in the chute 102 adjacent to the sensor 200. As such, portions of the optical signals output by the optical emitter elements 201*r*, 201*g*, and 201*b* are transmitted through the vial V2' to the optical detector 202, thereby affecting the respective intensities of the optical signals received at the optical detector 202 based on the physical characteristics of the vial V2'. As such, the optical detector 202 outputs a detection signal representing the amount of light received after passing through the red prescription vial V2'. The detection signal is analyzed as shown in FIG. 9B to provide a frequency domain representation 905 indicating the relative amplitudes of the red, green and blue subcarriers 901*r*, 901*g*, and 901*b* at the frequencies of the red, green, and blue control signals 609*r*, 609*g*, and 609*b*, respectively. In particular, the spectrum analyzer plot 905 of FIG. 9B shows that the amplitude of the red subcarrier 901*r* is attenuated by approximately 2 dB and the amplitude of the blue subcarrier 901*b* is attenuated by approximately 25 dB relative to the signal 705 of FIG. 7B. The amplitude of the green subcarrier 901*g* is attenuated by at least 30 dB, and is not detectable above the noise floor. As similarly noted above, the signals 705 and 905 represent the presence of ambient fluorescent lighting at a level that may be typical in an office environment. Accordingly, a controller circuit may determine that the vial V2' in the output chute 102 is red-colored based on the relatively low attenuation of the red subcarrier 901*r* and the significant attenuation of the blue and green subcarriers 901*g* and 901*b* in the signal 905. The controller circuit may also determine that the vial V2' is labeled based on the relative attenuation of the subcarriers 901*g* and 901*b* (due to at least partial blockage of the optical signals from the emitter elements 201*g* and 201*b* by the label) as compared to the subcarriers 901*r* in the signal 905.

Figure 10B:
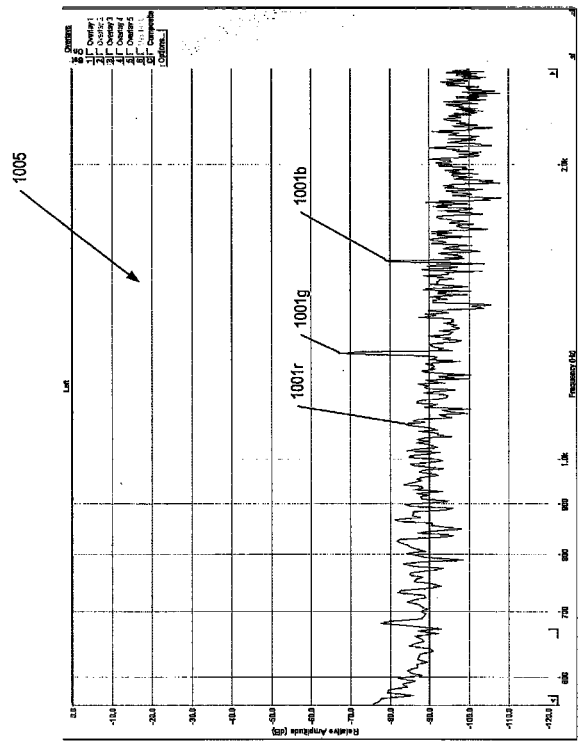
FIGS. 10A-10B illustrate chute conditions and detection signals when a green vial is present adjacent to the sensor in a chute unit
Figure 10A:
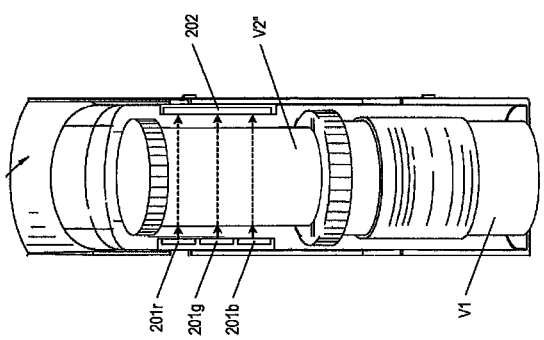

Referring now to FIG. 10A, a vial V1 is at the bottom or front of the chute 102, and a green-colored vial V2" is present in the chute 102 adjacent to the sensor 200. As such, portions of the optical signals output by the optical emitter elements 201*r*, 201*g*, and 201*b* are transmitted through the vial V2" to the optical detector 202, thereby affecting the respective intensities of the optical signals received at the optical detector 202 based on the physical characteristics of the vial V2". The optical detector 202 outputs a detection signal representing the amount of light received after passing through the red prescription vial V2", which is analyzed as shown in FIG. 10B to provide a frequency domain representation 1005 indicating the relative amplitudes of the red, green and blue subcarriers 1001*r*, 1001*g*, and 1001*b* at the frequencies of the red, green, and blue control signals 609*r*, 609*g*, and 609*b*, respectively. In particular, the spectrum analyzer plot 1005 of FIG. 10B indicates that the amplitude of the green subcarrier 1001*g* is attenuated by approximately 10 dB and the amplitude of the blue subcarrier 1001*b* is attenuated by approximately 22 dB in comparison to the signal 705 of FIG. 7B. The amplitude of the red subcarrier 1001*r* is attenuated by at least 30 dB, and is not detectable above the noise floor. As before, the signals 705 and 1005 represent the presence of ambient fluorescent lighting at a level that may be typical in an office environment. Accordingly, a controller circuit may determine that the vial V2" in the output chute 102 is green-colored based on the relatively low attenuation of the green subcarrier 1001*g* and the more significant attenuation of the blue and red subcarriers 1001*b* and 1001*r* in the signal 1005. The controller circuit may also determine that the vial V2" is unlabeled and empty based on the relative attenuation of the subcarriers 1001*r*, 1001*g*, and 1001*b* in the signal 1005.

It will be understood that the power spectral densities of FIGS. 7B, 8B, 9B, and 10B are provided only for purposes of illustration, and that embodiments of the present invention need not display and/or transform the detection signals described herein in order to determine the relative levels of the light output received from each of the optical emitter elements 201*r*, 201*g*, and/or 201*b*. Also, while illustrated in FIGS. 7A, 8A, 9A, and 10A with reference to a break-beam type optical sensor 200, those of skill in the art will appreciate that other types of optical sensors may be used. For example, a reflective-type sensor may be used in some embodiments, with the optical emitter 201 located on the same side of the chute 102 or other receptacle as the optical detector 202, and characteristics of a vial may be detected based on the intensities of the optical signals that are received at the optical detector 202 after being reflected by the vial. In addition, although illustrated in a vertical orientation in the chute 102, some embodiments of the invention may orient the optical emitters 201 in a horizontal and/or other relative orientation in the chute 102 or other receptacle. Also, while illustrated with reference to red, green, and blue emitter elements 201*r*, 201*g*, and 201*b*, it will be understood that emitter elements providing the same or different colors of light output may be used. For example, in a system using amber vials, one or more of the emitter elements 201*r*, 201*g*, and 201*b* may be operable to output amber-colored light. More generally, the colors of light output from the emitter elements 201*r*, 201*g*, and/or 201*b* may be selected to correspond to the color(s) of the pill-containing vials and/or other objects to be detected.

While described primarily with reference to detection of the color of a vial, embodiments of the present invention as shown in FIGS. 7A-10B may also be used to determine other physical characteristics of a vial in the output chute 102 based on optical spectral characteristics indicated by the detection signal output from the optical sensor 200. For example, the amount of the emitted light received at the detector 202 may be used to distinguish between a vial that is labeled (e.g., where a significant amount of light is absorbed thereby or otherwise not transmitted therethrough) versus a vial that is unlabeled. Also, based on the arrangement of the emitters 201 and the relative amounts of light received from each, a fill level of pills in a vial may be detected (e.g., where significant light is received from one or more emitters but not from others). Moreover, due to the unique signatures of the light output provided by each of the emitters 201, the effects of ambient light in the detection of vial characteristics may be reduced and/or eliminated.

TABLE 1

| S/N Difference for Presence/ Absence of Vial (Conventional Detection) | | S/N Difference for Presence/ Absence of Vial (Present Invention) | |
|---|---|---|---|
| Low Ambient | High Ambient | Low Ambient | High Ambient |
| 36 mV | 705 mV | −62 dB | −27 dB |
| 764 mV | 1422 mV | −27 dB | −53 dB |
| 27 dB Δ | 6 dB Δ | 35 dB Δ | 26 dB Δ |

Table 1 illustrates detection of vials in an output chute in relatively low and relatively high ambient light conditions using conventional detection techniques in comparison with detection techniques according to some embodiments of the present invention. In particular, Table 1 illustrates signal-to-noise (S/N) ratios provided by conventional vial detection techniques in comparison to vial detection in accordance with embodiments of the present invention. Such conventional techniques may employ a single continuous emitter and a single detector, where a continuous wave control signal may be applied to the emitter without modulation, and where the detector may measure the amount of light received and output a proportional voltage. However, it may be difficult and/or impossible for such conventional techniques to discriminate between light from the emitter and light from ambient sources.

As shown in Table 1, in low ambient light conditions, conventional detection techniques provide a difference of about 27 dB in the signal-to-noise (S/N) ratio of the detection signal when a vial is present adjacent to a sensor 200 in the output chute 102 as compared to S/N ratio of the detection signal when a vial is absent (e.g., not adjacent to the sensor 200) in the chute 102. Such a difference may result in accurate detection of the vial in the chute 102. However, in high ambient light conditions, there is only a 6 dB difference in the S/N ratios of the detection signals when a vial is present as compared to when a vial is absent in the chute 102, indicating that it may be more difficult to distinguish between the presence and absence of the vial in high ambient light conditions. In contrast, some embodiments of the present invention provide difference of about 35 dB in the S/N ratios of the detection signals when a vial is present as compared to when a vial is absent in the chute 102 in low ambient light conditions, while also providing a significant difference of about 26 dB in the S/N ratios of the detection signals indicating presence/absence of the vial in high ambient light conditions. As such, embodiments of the present invention may significantly reduce and/or eliminate the effect of ambient light conditions on vial detection.

Figure 11:
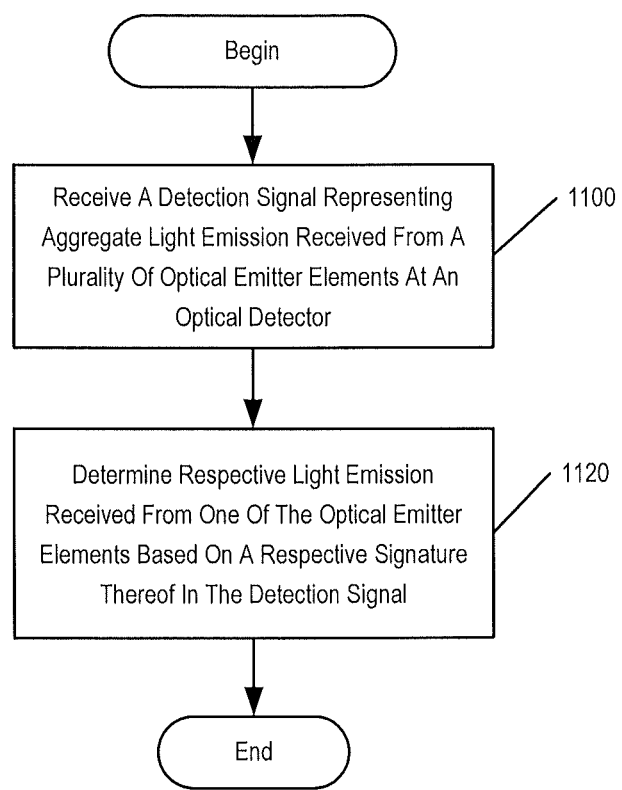
FIG. 11 is a flowchart illustrating example operations of detection systems and methods according to some embodiments of the present invention.

FIG. 11 is a flowchart illustrating example operations of detection systems and methods in accordance with some embodiments of the present invention. Referring now to FIG. 11, a detection signal is received at Block 1100. The detection signal represents aggregate light emission received from a plurality of optical emitter elements at an optical detector. The light output from each of the optical emitter elements may include a respective, unique signature that is independent of emission wavelength. For example, while the light output from a particular emitter element may be red in color (e.g., having a wavelength of about 600 to about 720 nm), the unique signature may indicate a frequency at which the emitter element was switched. Each emitter may thereby be switched at a different frequency in response to a respective control signal to provide its unique signature, such that the optical signal output from the emitter element indicates the frequency at which its control signal was modulated. Respective light emission received at the optical detector from at least one of the optical emitter elements is thereby determined at Block 1120 based on the respective signature thereof in the detection signal. As such, the light emission received from a particular optical emitter element may be identified based on a unique signature of the light emission that is independent of and distinct from the emission wavelength.

Figure 12:
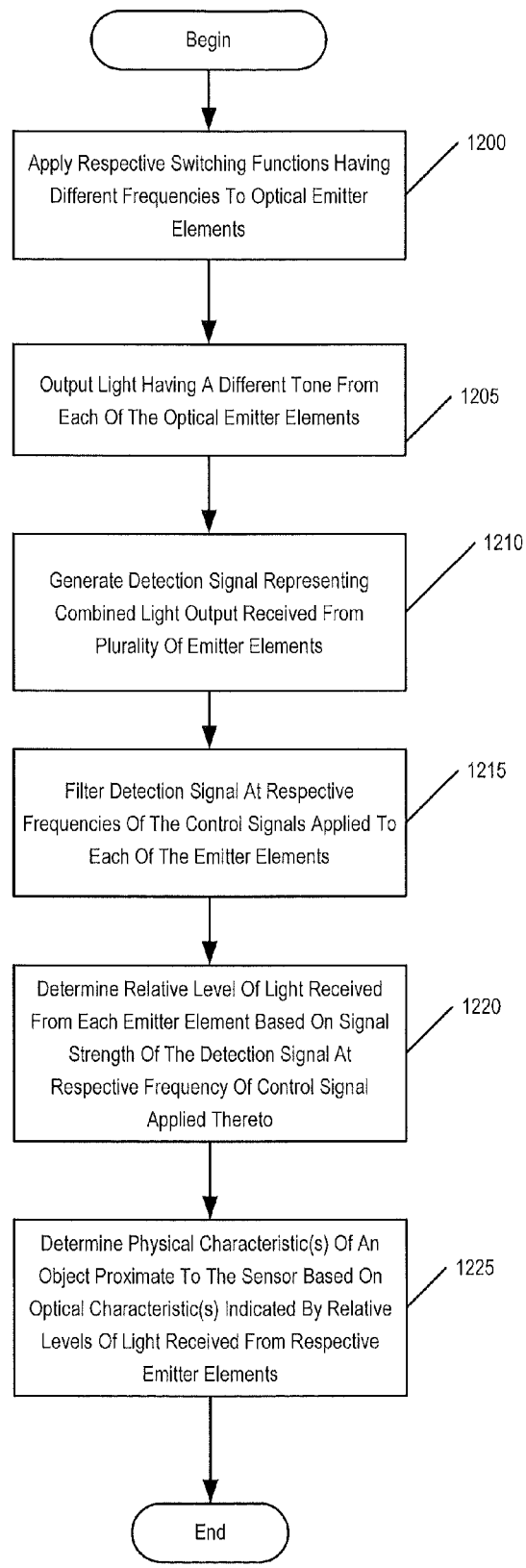
FIG. 12 is a flowchart illustrating example operations of detection systems and methods according to further embodiments of the present invention.

FIG. 12 is a flowchart illustrating example operations of detection systems and methods in accordance with some embodiments of the present invention in greater detail. Referring now to FIG. 12, respective switching functions having different frequencies are applied to optical emitter elements to modulate the respective light outputs of the optical emitter elements at Block 1200, and light having a different tone is output from each of the optical emitter element in response to the respective switching functions at Block 1205. The combined light output from the plurality of optical emitter elements is received at an optical detector, and a detection signal is generated responsive to the received light output at Block 1210. The detection signal thereby represents aggregate light emission for the light received from the plurality of optical emitter elements. At Block 1215, the detection signal is filtered at the respective frequencies of the control signals applied to each of the emitter elements, and a relative level of light output received from each of the emitter elements is determined at Block 1220 based on the respective power levels or signal strengths of the detection signal at the respective frequencies of the control signals. For example, the relative level of light output for each of the emitter elements may be determined by comparing the respective signal strengths of subcarrier signals in detection signal, which indicate the portion of the modulated light output of a particular optical emitter element that is received at the detector. Finally, at Block 1225, one or more physical characteristics of an object proximate to the emitter elements and/or the detector are determined based on one or more optical characteristics indicated by the relative level of the light output received from each of the emitter elements.

The flowcharts of FIGS. 11 and 12 illustrate the architecture, functionality, and operations of embodiments of hardware and/or software according to various embodiments of the present invention. It will be understood that each block of the flowchart and/or block diagram illustrations, and combinations of blocks in the flowchart and/or block diagram illustrations, may be implemented by computer program instructions and/or hardware operations. In this regard, each block represents a module, segment, or portion of code, which comprises one or more executable instructions for implementing the specified logical function(s).

It should be noted that, in other implementations, the function(s) noted in the blocks may occur out of the order noted in FIGS. 11 and 12. For example, two blocks shown in succession may, in fact, be executed substantially concurrently, or the blocks may sometimes be executed in the reverse order, depending on the functionality involved. These computer program instructions may be provided to a processor of a general purpose computer, a special purpose computer, or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

Accordingly, embodiments of the present invention may identify the light emission from a particular optical emitter element in a detection signal based on a unique signature of the light emission that is independent of a wavelength thereof. For example, the unique signature may indicate a characteristic of the control signal applied to the emitter element, such as the frequency of the switching signal applied to a LED. Thus, embodiments of the present invention may use frequency domain analysis to determine the relative levels of light received from each of a plurality of emitters. In contrast, some other detectors may include several narrow bandwidth or monochromatic detectors, one for each wavelength of interest, and compare the relative outputs of each detector to determine the intensity of the light received based on wavelength, which may be affected by ambient light conditions.

Embodiments of the present invention are designed to work with many different bottle or vial configurations, regardless of ambient lighting conditions. Thus, driving the optical emitters using the different switching signals to modulate the light output as described herein can provide a robust solution to improve the efficiency and operation of robotic pharmaceutical dispensing systems. Systems according to embodiments of the present invention may also automatically detect physical characteristics of vials in the output chutes based on the detected optical characteristics thereof and may take action accordingly, which may result in less stoppage of the system.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of all combinations and subcombinations of the embodiments described herein, and of the manner and process of making and using them, and shall support claims to any such combination or subcombination.

The foregoing is illustrative of the present invention and is not to be construed as limiting thereof. Although a few exemplary embodiments of this invention has been described, those skilled in the art will readily appreciate that many modifications are possible in the exemplary embodiments without materially departing from the novel teachings and advantages of this invention. Accordingly, all such modifications are intended to be included within the scope of this invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the invention.

That which is claimed:

1. A method of operating a pill dispensing system, the method comprising:
   receiving a detection signal representing aggregate light emission received from a plurality of optical emitter elements at a broad spectrum optical detector operating asynchronously therefrom; and
   determining, from the detection signal, respective light emission received from each of the optical emitter elements based on a respective signature thereof in the detection signal, wherein the respective signature is independent of an emission wavelength thereof;
   detecting a physical characteristic of a pill-containing vial proximate to the optical detector based on an optical characteristic thereof indicated by the respective light emission received from each of the optical emitter elements; and
   controlling a subsequent operation of the system responsive to determining the physical characteristic of the pill-containing vial.

2. The method of claim 1, wherein the respective signature indicates a characteristic of a control signal applied to a corresponding one of the optical emitter elements.

3. The method of claim 2, wherein the characteristic of the control signal comprises a frequency of the control signal, and wherein determining the respective light emission received from the corresponding one of the optical emitter elements comprises:
   determining a signal strength of the detection signal at the frequency of the control signal applied to the corresponding one of the optical emitter elements.

4. The method of claim 1, further comprising:
   applying respective control signals to the plurality of optical emitter elements, wherein each of the optical emitter elements provides light emission indicative of a characteristic of a respective one of the control signals applied thereto,
   wherein the detection signal is received in response to applying the respective control signals, and wherein determining the respective light emission received comprises determining, from the detection signal, a relative level of the light emission received from each of the optical emitter elements based on the characteristic of the respective one of the control signals applied thereto indicated by the detection signal.

5. The method of claim 1, wherein the light emission from each of the optical emitter elements corresponds to a different color of a visible spectrum, and wherein the physical characteristic comprises a color of the object.

6. The method of claim 1, further comprising:
   determining a position of the object relative to the optical detector based on respective positions of the optical emitter elements and the relative level of the light emission received from each of the optical emitter elements.

7. The method of claim 1, wherein the physical characteristic comprises a presence or absence of the vial, a color of the vial, a labeling status of the vial, and/or a fill level of the vial.

8. The method of claim 1, wherein the respective signature comprises a respective tone indicating a switching frequency of the light emission that is distinct from that of an ambient light source.

9. A computer program product for operating a detection system, the computer program product comprising a non-transitory computer readable storage medium having computer readable program code embodied therein, the computer readable program code comprising:
   computer readable program code that, when executed by a processor, is operable to carry out the method of claim 1.

10. The method of claim 1, wherein the physical characteristic comprises a labeling status or a fill level of the pill-containing vial, and wherein controlling the subsequent operation comprises alerting a user as to the labeling status or fill level of the pill-containing vial responsive to determining the physical characteristic thereof.

11. A pill dispensing comprising:
   an optical sensor comprising a plurality of emitter elements and a broad spectrum detector configured to be operated cooperatively and asynchronously to output a detection signal representing aggregate light emission received from the plurality of emitter elements; and a controller circuit coupled to the optical sensor and configured to determine, from the detection signal, respective light emission received from each of the emitter elements based on a respective signature thereof in the detection signal, wherein the respective signature is independent of an emission wavelength thereof, to detect a physical characteristic of a pill-containing vial proximate to the detector based on an optical characteristic thereof indicated by the respective light emission received from each of the optical emitter elements, and to control a subsequent operation of the system responsive to determining the physical characteristic of the pill-containing vial.

12. The system of claim 11, wherein the respective signature indicates a characteristic of a control signal applied to a corresponding one of the emitter elements.

13. The system of claim 12, wherein the characteristic of the control signal comprises a frequency of the control signal, and wherein the controller circuit is operable to determine the respective light emission received from the corresponding one of the emitter elements by determining a signal strength of the detection signal at the frequency of the control signal applied to the corresponding one of the emitter elements.

14. The system of claim 12, further comprising:
a driver circuit operable to apply respective control signals to the plurality of emitter elements, wherein each of the emitter elements provides light emission indicative of a characteristic of a respective one of the control signals applied thereto,
wherein the optical sensor is operable to output the detection signal responsive to application of the respective control signals by the driver circuit, and wherein the controller circuit is operable to determine, from the detection signal, a relative level of the light emission received from each of the emitter elements based on the characteristic of the respective one of the control signals applied thereto indicated by the detection signal.

15. The system of claim 14, wherein the controller circuit is operable to filter a frequency domain representation of the detection signal at respective frequencies of the respective control signals applied to the plurality of optical emitter elements and to determine the relative level of the light emission received from each of the optical emitter elements based on a relative power level of the frequency domain representation of the detection signal at a respective one of the frequencies of a respective one of the control signals applied thereto.

16. The system of claim 11, wherein each of the emitter elements is operable to provide light emission of a different color of a visible spectrum, and wherein the at least one physical characteristic comprises a color of the object.

17. The system of claim 11, wherein the controller circuit is operable to determine a position of the object relative to the optical sensor based on respective positions of the emitter elements and the relative level of the light emission received from each of the emitter elements.

18. The system of claim 11, wherein the system comprises a receptacle including the optical sensor therein, and wherein the at least one physical characteristic comprises a presence or absence of the vial in the receptacle, a color of the vial, a labeling status of the vial, and/or a fill level of the vial.

19. The system of claim 11, wherein the respective signature comprises a respective tone indicating a switching frequency of the light emission that is distinct from that of an ambient light source.

20. The system of claim 11, wherein the at least one physical characteristic comprises a labeling status or a fill level of the pill-containing vial, and wherein the control circuit is further configured to alert a user as to the labeling status or fill level of the pill-containing vial responsive to determination of the physical characteristic thereof.

21. An automated pill dispensing system, comprising:
a receptacle configured to hold vials, the vials being configured to hold pills therein;
an optical sensor located at a predetermined location in the receptacle, the optical sensor comprising a plurality of emitter elements and a broad spectrum detector configured to be operated cooperatively and asynchronously to output a detection signal representing aggregate light emission received from the plurality of emitter elements; and
a controller circuit coupled to the optical sensor and configured to determine, from the detection signal, a relative level of light emission received from each of the emitter elements based on respective signatures thereof in the detection signal, wherein the respective signatures are independent of emission wavelength, to detect at least one physical characteristic of a pill-containing vial in the receptacle based on at least one optical characteristic thereof indicated by the relative level of the light emission received from each of the emitter elements, and to control a subsequent operation of the system responsive to determining the at least one physical characteristic of the pill-containing vial.

22. The system of claim 21, wherein the respective signatures indicate a characteristic of a control signal applied to a corresponding one of the emitter elements.

23. The system of claim 22, further comprising:
a driver circuit operable to apply respective control signals to the plurality of emitter elements to modulate the respective light emission to provide the respective signatures,
wherein the optical sensor is operable to output the detection signal responsive to application of the respective control signals by the driver circuit, and wherein the controller circuit is operable to determine, from the detection signal, the relative level of the light emission received from each of the emitter elements based on the characteristic of the respective one of the control signals applied thereto.

24. The system of claim 21, wherein the at least one physical characteristic comprises a labeling status of the vial or a fill level of the vial, and wherein the controller circuit is further configured to alert a user as to the labeling status or fill level of the pill-containing vial.

* * * * *